US011475567B2

(12) United States Patent
Matsumoto et al.

(10) Patent No.: US 11,475,567 B2
(45) Date of Patent: Oct. 18, 2022

(54) IMAGE PROCESSING APPARATUS, IMAGE PROCESSING METHOD, IMAGE PROCESSING PROGRAM, AND RECORDING MEDIUM STORING PROGRAM

(71) Applicant: FUJIFILM Corporation, Tokyo (JP)

(72) Inventors: Tetsuya Matsumoto, Tokyo (JP); Kei Yamaji, Tokyo (JP); Shinichiro Sonoda, Tokyo (JP); Nobuya Tanaka, Tokyo (JP); Hirotoshi Yoshizawa, Tokyo (JP)

(73) Assignee: FUJIFILM Corporation, Tokyo (JP)

( * ) Notice: Subject to any disclaimer, the term of this patent is extended or adjusted under 35 U.S.C. 154(b) by 51 days.

(21) Appl. No.: 16/893,124

(22) Filed: Jun. 4, 2020

(65) Prior Publication Data

US 2020/0410680 A1    Dec. 31, 2020

(30) Foreign Application Priority Data

Jun. 28, 2019  (JP) .............................. JP2019-121862

(51) Int. Cl.
*G06T 7/00* (2017.01)
*G06F 3/12* (2006.01)
(Continued)

(52) U.S. Cl.
CPC .......... *G06T 7/0014* (2013.01); *G06F 3/1243* (2013.01); *G06K 9/6215* (2013.01); *G06V 40/10* (2022.01); *G06T 2207/30196* (2013.01)

(58) Field of Classification Search
CPC ......... G06T 7/0014; G06T 2207/30196; G06F 3/1243; G06F 16/54; G06K 9/00362; G06K 9/6215; G06K 9/00677; G06K 9/00288
(Continued)

(56) References Cited

U.S. PATENT DOCUMENTS

2009/0310863 A1   12/2009  Gallagher et al.
2011/0150302 A1*  6/2011  Moriyama ............ G06F 16/583
                                                382/118
(Continued)

FOREIGN PATENT DOCUMENTS

JP    2010-026713 A    2/2010
JP    2010-079519 A    4/2010
(Continued)

OTHER PUBLICATIONS

An Office Action; "Notice of Reasons for Refusal," mailed by the Japanese Patent Office dated Jun. 21, 2022, which corresponds to Japanese Patent Application No. 2019-121862 and is related to U.S. Appl. No. 16/893,124; with English language translation.

*Primary Examiner* — Ayodeji O Ayotunde
(74) *Attorney, Agent, or Firm* — Studebaker & Brackett PC

(57) ABSTRACT

Provided are an image processing apparatus, an image processing method, an image processing program, and a recording medium that stores the program, capable of finding images of different persons captured in the same age. An image is specified as a first image, a user in the image is recognized as a first person, and an age thereof is estimated. An image is specified as a second image, a user in the image is recognized as a second person, and an age thereof is estimated. In a case where the user recognized as the first person and the user recognized as the second person are not the same person and a difference between the age of the user and the age of the user is within a range of a threshold value, the first image and the second image are detected as an image combination.

17 Claims, 19 Drawing Sheets

(51) Int. Cl.
 *G06K 9/62* (2022.01)
 *G06V 40/10* (2022.01)
(58) Field of Classification Search
 USPC .......................................................... 382/118
 See application file for complete search history.

(56) References Cited

U.S. PATENT DOCUMENTS

| | | |
|---|---|---|
| 2012/0002878 A1 | 1/2012 | Kuriyama |
| 2012/0051629 A1 | 3/2012 | Ueki et al. |
| 2014/0376786 A1* | 12/2014 | Johnson .............. G06F 16/5838 |
| | | 382/118 |
| 2015/0092997 A1 | 4/2015 | Yamaguchi |
| 2019/0205624 A1 | 7/2019 | Nakada et al. |

FOREIGN PATENT DOCUMENTS

| | | |
|---|---|---|
| JP | 2010-113526 A | 5/2010 |
| JP | 2010-257409 A | 11/2010 |
| JP | 2011-525017 A | 9/2011 |
| JP | 2012-014376 A | 1/2012 |
| JP | 2015-069495 A | 4/2015 |
| JP | 2016-154366 A | 8/2016 |
| JP | 2018-005843 A | 1/2018 |

\* cited by examiner

IMAGE PROCESSING APPARATUS, IMAGE PROCESSING METHOD, IMAGE PROCESSING PROGRAM, AND RECORDING MEDIUM STORING PROGRAM

CROSS-REFERENCE TO RELATED APPLICATIONS

The present application claims priority under 35 U.S.C. § 119 to Japanese Patent Application No. 2019-121862, filed Jun. 28, 2019. Each of the above application(s) is hereby expressly incorporated by reference, in its entirety, into the present application.

BACKGROUND OF THE INVENTION

1. Field of the Invention

The present invention relates to an image processing apparatus, an image processing method, an image processing program, and a recording medium that stores the program.

2. Description of the Related Art

In a case where a photo book or the like is created using a predetermined person as a main character, even the same person may not be recognized as the same person due to a facial change. For this reason, a technique capable of performing accurate person recognition in accordance with a temporal change of a face has been considered (JP2015-069495A). In addition, a technique in which individual identification information is classified for each person and an efficient image search is performed in searching for an image including a person has been considered (JP2010-079519A). Further, a technique of selecting images that match a theme of a photo album from a plurality of images collected from a plurality of users has been considered (JP2018-005843A).

SUMMARY OF THE INVENTION

In a case where two or more images are to be grouped from a lot of images, the images are often grouped into images having close imaging dates and times, images captured at a specific event, and favorite images. However, for example, if an image of the childhood of a father can be compared with an image of the childhood of a child of the father, a user may discover new feelings or surprises. Thus, many captured images may be reviewed, or new communication may be triggered by the captured images, which may lead to promotion of utilization of many images.

The invention disclosed in JP2015-069495A performs accurate person recognition, and thus, does not consider a technique of finding images of parents and children of the same age. The invention disclosed in JP2010-079519A performs an efficient image search, and thus, does not consider a technique of finding images of parents and children of the same age. The invention disclosed in JP2018-005843A selects images that match a theme of a photo album, and thus, does not consider a technique of finding images of parents and children of the same age.

An object of the invention is to provide a technique of finding images of different persons captured in the same age, for example, an image of the childhood of parents and an image of the childhood of children of the parent.

According to an aspect of the present invention, there is provided an image processing apparatus including: a reading device (reading means) for reading an image from a recording device in which a plurality of images accessible by one user are recorded; a first image specifying device (first image specifying means) for specifying any one of the plurality of images as a first image; a first person recognizing device (first person recognizing means) for recognizing a first person included in the first image; a first age estimating device (first age estimating means) for estimating a first age of the first person at date and time of imaging for the first image; a second image specifying device (second image specifying means) for specifying any one of the plurality of images other than the first image as a second image; a second person recognizing device (second person recognizing means) for recognizing a second person included in the second image; a second age estimating device (second age estimating means) for estimating a second age of the second person at date and time of imaging for the second image; a person determining device (person determining means) for determining whether or not the recognized first person and the recognized second person are the same person; an age difference determining device (age difference determining means) for determining whether or not a difference between the estimated first age and the estimated second age is within a range of a threshold range; and an image combination detecting device (image combination detecting means) for detecting the first image and the second image as an image combination in a case where it is determined by the person determining device that the first person and the second person are not the same person and it is determined by the age difference determining device that the difference between the first age and the second age is within the range of the threshold value.

According to another aspect of the present invention, there is provided an image processing method. That is, in the image processing method, a reading device (reading means) reads an image from a recording device (recording device) in which a plurality of images accessible by one user are recorded; a first image specifying device (first image specifying means) specifies any one of the plurality of images as a first image; a first person recognizing device (first person recognizing means) recognizes a first person included in the first image; a first age estimating device (first age estimating device) estimates a first age of the first person at date and time of imaging for the first image; a second image specifying device (second image specifying means) specifies any one of the plurality of images other than the first image as a second image; a second person recognizing device (second person recognizing device) recognizes a second person included in the second image; a second age estimating device (second age estimating device) estimates a second age of the second person at date and time of imaging for the second image; a person determining device (person determining means) determines whether or not the recognized first person and the recognized second person are the same person; an age difference determining device (age difference determining device) determines whether or not a difference between the estimated first age and the estimated second age is within a range of a threshold range; and an image combination detecting device (image combination detecting device) detects the first image and the second image as an image combination in a case where it is determined by the person determining device that the first person and the second person are not the same person and it is determined by the age difference determining device that the difference between the first age and the second age is within the range of the threshold value.

Further, according to still another aspect of the present invention, there is provided a program for controlling a computer of the image processing apparatus, and a recording medium that stores the program.

Further, according to a still aspect of the present invention, there is provided an image processing apparatus including: a reading device (reading means) for reading an image from a recording device in which a plurality of images accessible by one user are recorded; and a processor, in which the processor may perform processes of specifying any one of the plurality of images as a first image, recognizing a first person included in the first image, estimating a first age of the first person at date and time of imaging for the first image, specifying any one of the plurality of images other than the first image as a second image, recognizing a second person included in the second image, estimating a second age of the second person at date and time of imaging for the second image, determining whether or not the recognized first person and the recognized second person are the same person, determining whether or not a difference between the estimated first age and the estimated second age is within a range of a threshold range, and detecting the first image and the second image as an image combination in a case where it is determined that the first person and the second person are not the same person and it is determined that the difference between the first age and the second age is within the range of the threshold value.

The second image specifying device specifies an image whose imaging date is separated from the imaging date of the first image by a threshold value or greater as the second image, for example.

Further, the second image specifying device may specify an image captured at the same period as an imaging period (for example, imaging season or imaging month) of the first image, in a year different from a year when the first image was captured, as the second image, or may specify an image having the same composition as a composition of the first image as the second image.

Further, the second image specifying device may specify an image captured at the same location as a location where the first image was captured, as the second image, or may specify an image in which at least one of a relative or an affine of a person included in the first image is included, as the second image.

Further, the second image specifying device specifies an image captured at the same event as an event when the first image was captured, as the second image, for example.

The image processing apparatus may further include a control device (control means) for controlling the image processing apparatus to repeat at least one of the specification of the first image or the specification of the second image until at least one image combination is detected.

The image processing apparatus may further include a similarity degree calculating device (similarity degree calculating means) for calculating at least one of a first similarity degree between the first person and the second person or a second similarity degree between the first image and the second image. In this case, the image combination detecting device detects the first image and the second image as the image combination in a case where the first similarity degree or the second similarity degree is equal to or greater than a threshold value.

The recording device has a plurality of images showing relatives or affines of a specific person recorded thereon.

The image processing apparatus may further include a display control device (display control means) for controlling a display device to display the first image and the second image to be adjacent to each other.

The image processing apparatus may further include printer control means for controlling the printer to print the first image and the second image adjacent to each other.

The first image specifying means specifies the first image in accordance with a command from a user, for example.

Since the first person included in the detected first image and the second person included in the second image are not the same person but the age difference at the time of imaging is within the range of the threshold value, for example, it is possible to find images of different persons captured in the same age, such as an image of the childhood of a father and an image of the childhood of a child of the father, for example.

DESCRIPTION OF THE PREFERRED EMBODIMENTS

First Embodiment

Figure 1:
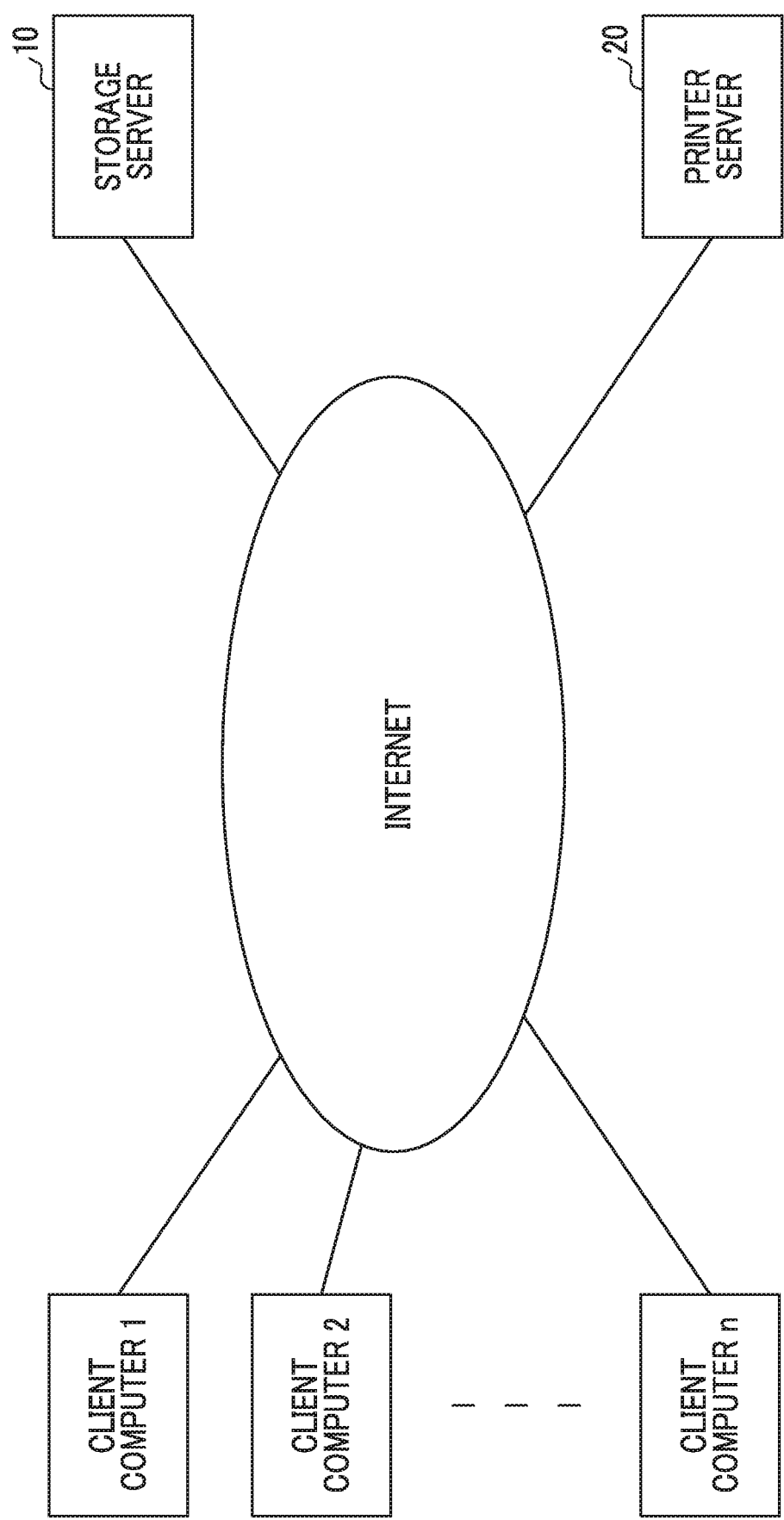
FIG. 1 shows an outline of an image processing system.

FIG. 1 shows an embodiment of the present invention, which shows an outline of an image processing system. Hereinafter, the term "close age (age group)" means that a difference in age is within a range of a threshold value.

The image processing system includes n client computers 1 to n (in which n is an integer greater than 1), and these n client computers 1 to n are connected to the Internet. Further, the image processing system also includes a storage server 10 and a printer server 20, and each of the storage server 10 and the printer server 20 is able to communicate with each of the n client computers 1 to n through the Internet.

As the client computers 1 to n transmit an image file that represents an image captured by a user to the storage server 10, the storage server 10 receives and stores the image file transmitted from the user. The printer server 20 prints a first image and a second image determined as described later to be adjacent to each other (see FIG. 9).

Although the n client computers 1 to n are shown in FIG. 1, only one client computer may be included in the image processing system. Regardless of the number of client computers, it is sufficient if a plurality of users can upload image data to the storage server 10 using the client computers. Further, a communication device such as a smartphone may be used instead of the client computers 1 to n.

Further, the image processing system may be configured without rising the printer server 20.

Figure 2:
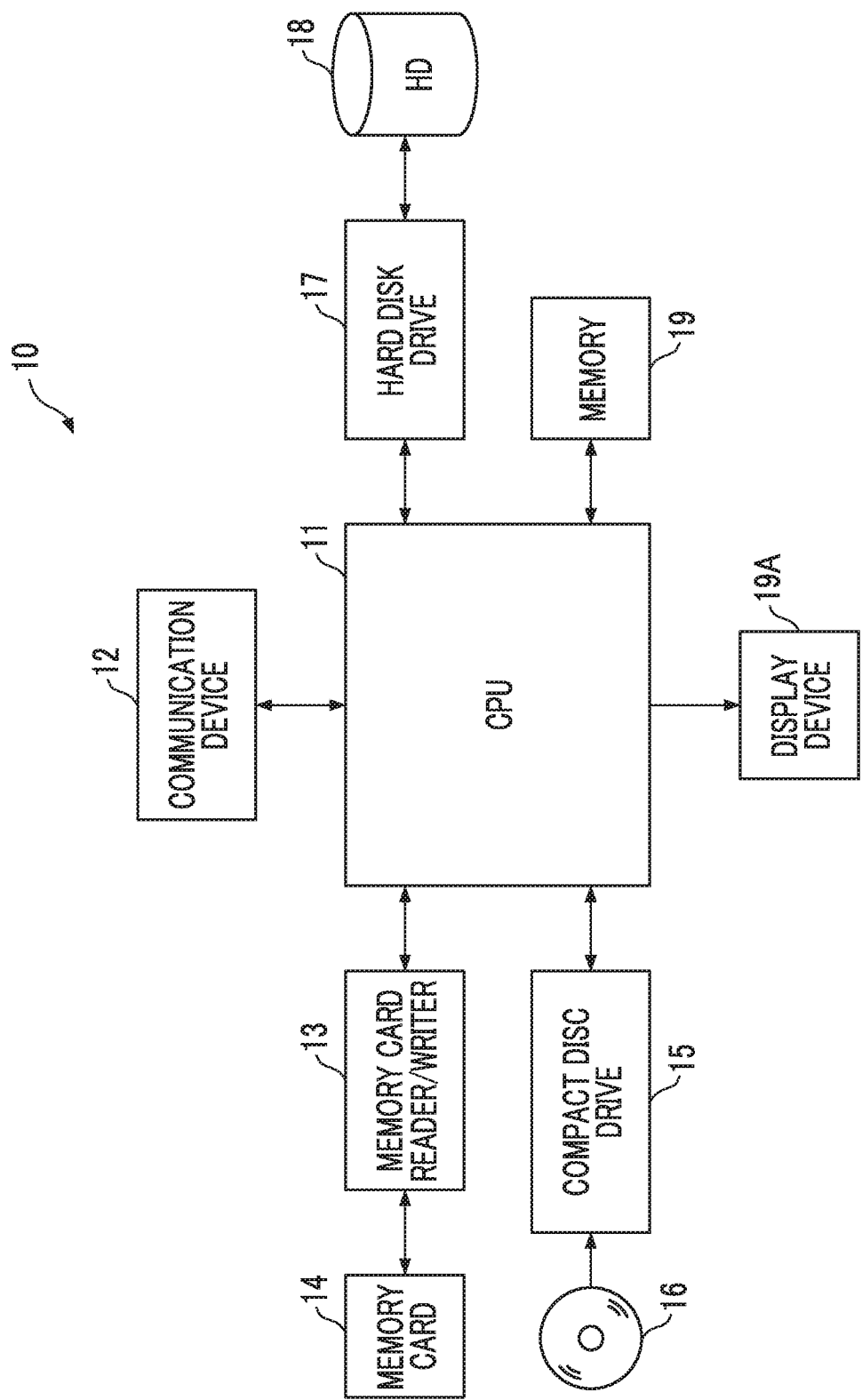
FIG. 2 is a block diagram showing an electrical configuration of a storage server.

FIG. 2 is a block diagram showing an electrical configuration of the storage server 10.

An overall operation of the storage server 10 (which is an example of an image processing apparatus) is controlled by a central processing unit (CPU) 11.

The storage server 10 includes a communication device 12 for connecting to the Internet, a memory card reader/writer 13 for accessing a memory card 14, and a compact disc drive 15 for reading data or the like recorded on a compact disc 16, a hard disk 18 for recording an image file or the like transmitted from a user, and a hard disk drive 17 for writing an image file to the hard disk 18 and reading an image file from the hard disk 18. Further, the storage server 10 also includes a memory 19 and a display device 19A.

A program for controlling the operation of the storage server 10 is stored on the compact disc 16 (portable recording medium), and the program recorded on the compact disc 16 is read by the compact disc drive 15 and is installed to the storage server 10. The program may be received by the storage server 10 through a network such as the Internet instead of being read from the compact disc 16 and being installed to the storage server 10, and the received program may be installed to the storage server 10. Similarly to the storage server 10, the printer server 20 includes a CPU, a memory, a hard disk, a communication device, and the like.

Figure 3:
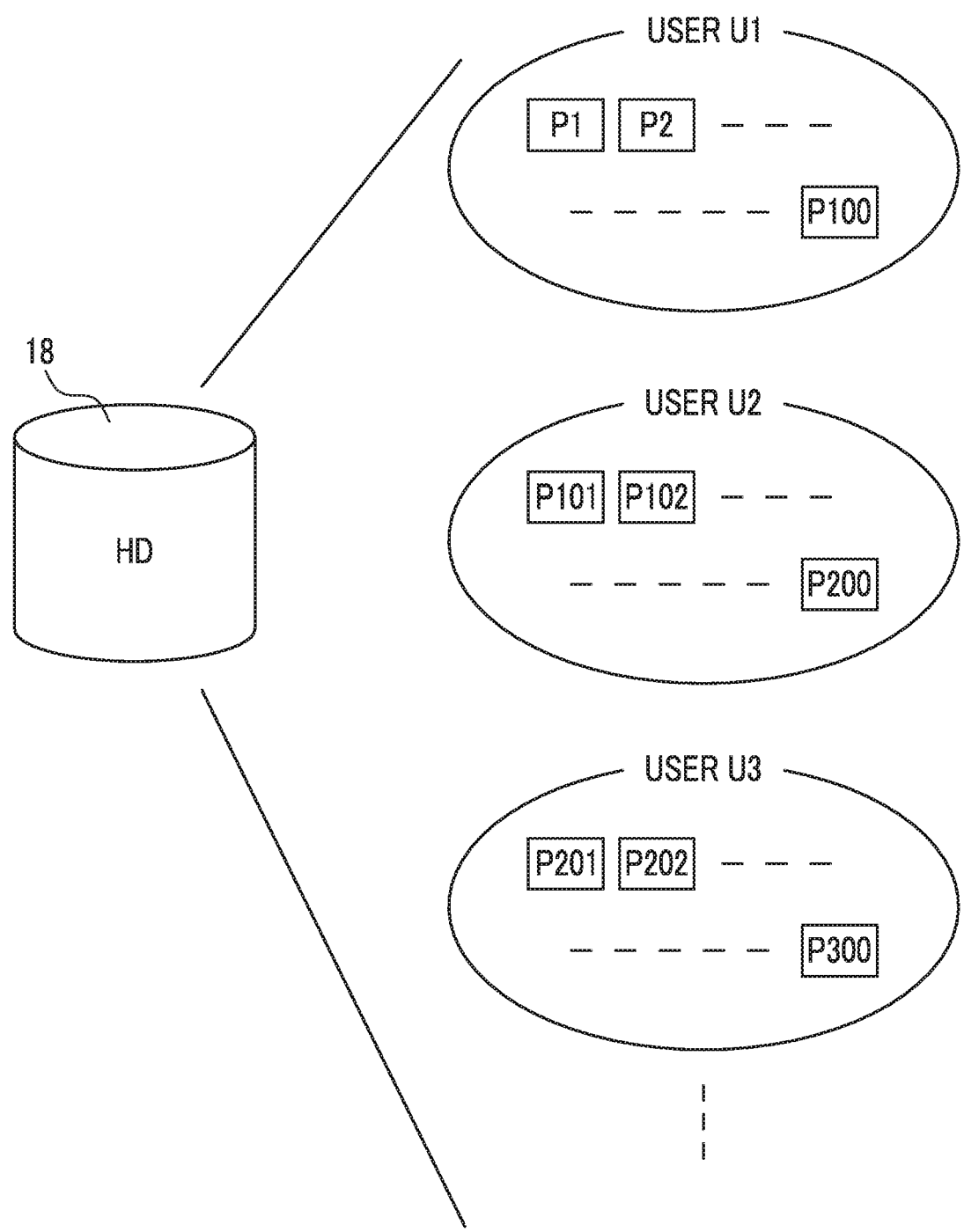
FIG. 3 shows an example of an image stored on a hard disk.

FIG. 3 shows a plurality of images stored on the hard disk 18.

The hard disk 18 stores a plurality of images of a plurality of users, such as images P1 to P100 of a user U1, images P101 to P200 of a user U2, and images P201 to P300 of a user U3. Images of users other than the users U1, U2 and U3 are also stored on the hard disk 18. By using a user ID and a password, the user U1 may access the images P1 to P100 of the user U1, but cannot access images of other users, for example, the images P101 to P200 of the user U2 or the images P201 to P300 of the user U3. The other users can access their own images, but cannot access images of other users.

In this embodiment, an image of a specific user and an image of a parent, a child, an elder brother, a younger brother, an elder sister, a younger sister, etc., captured at the same age as an age of the specific user at the time of imaging are found. For example, an image when the specific user was born and an image when the fattier of the specific user was born are found, or an image of an entrance ceremony of an elementary school of the specific user and an image of an entrance ceremony of an elementary school of the father of the specific user are found. In this embodiment, the user U1 is set as a specific user, but the other user U2 or U3 may be set as the specific user.

Figure 4:
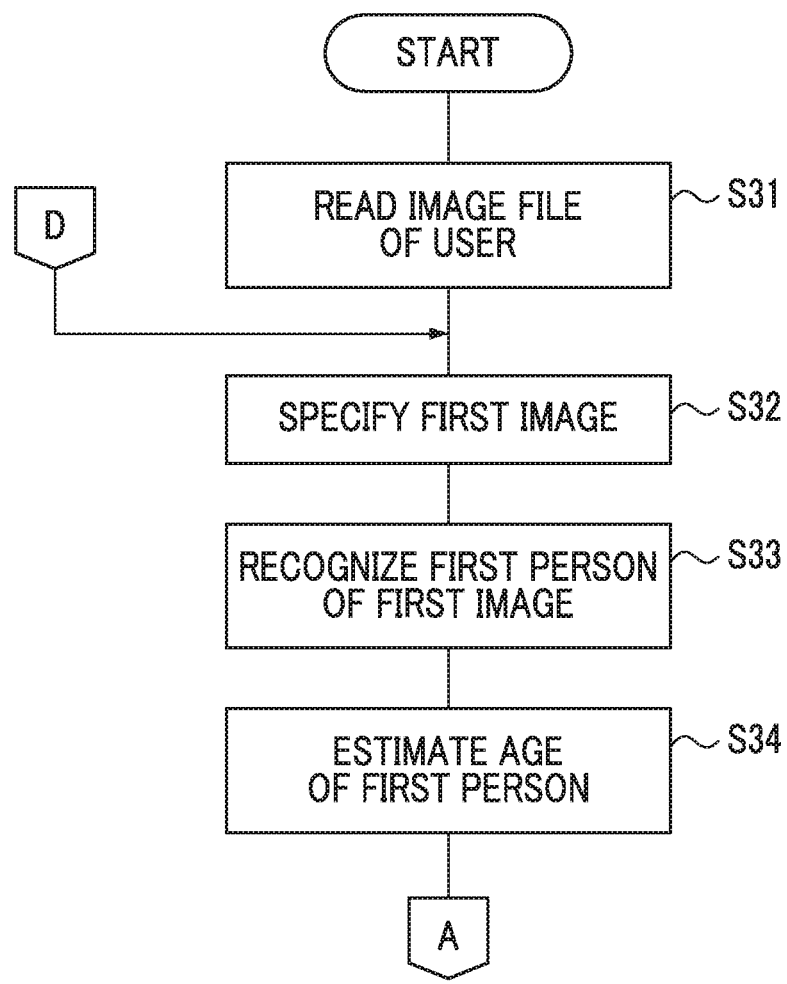
FIG. 4 is a flowchart illustrating a processing procedure of the storage server.
Figure 5:
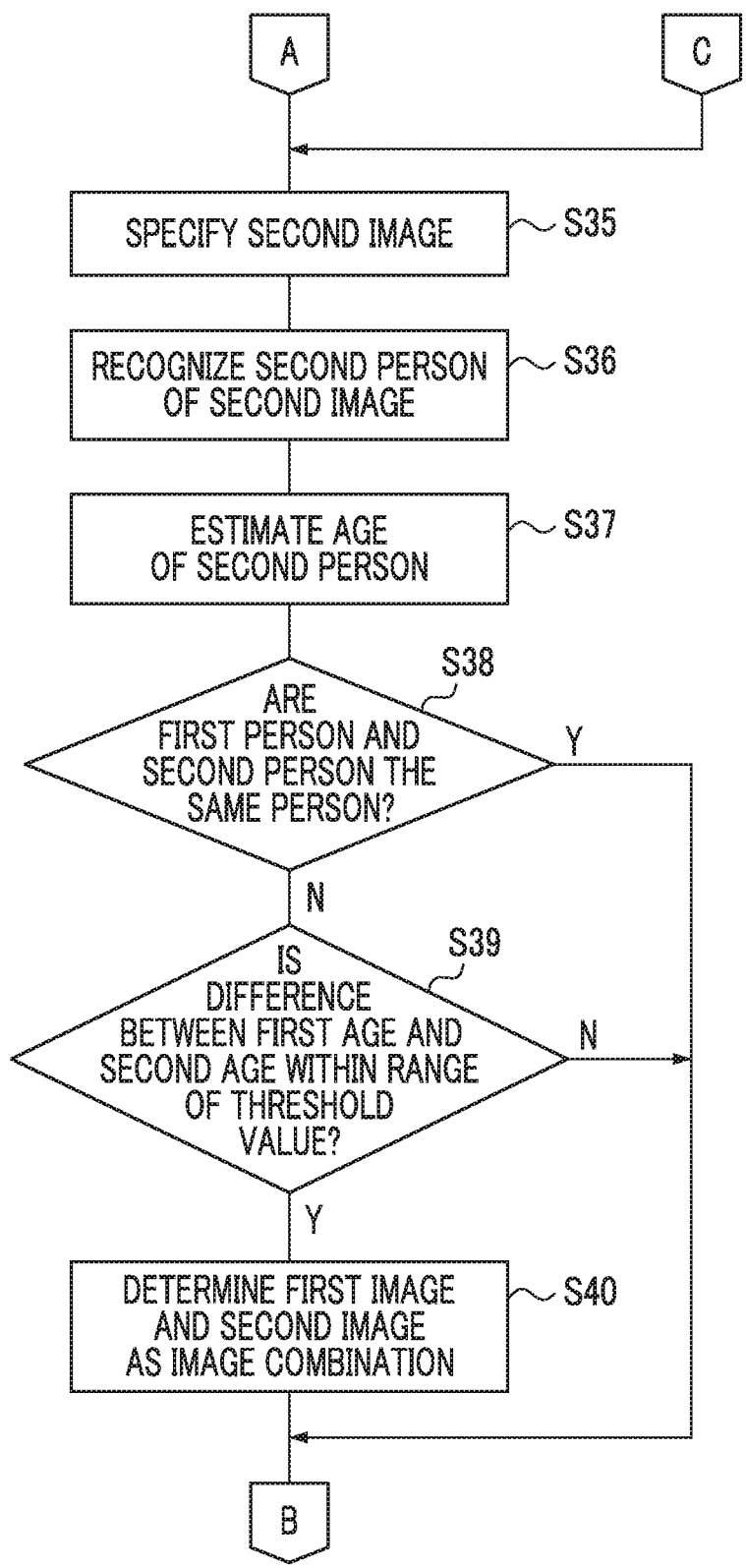
FIG. 5 is a flowchart illustrating a processing procedure of the storage server.
Figure 6:
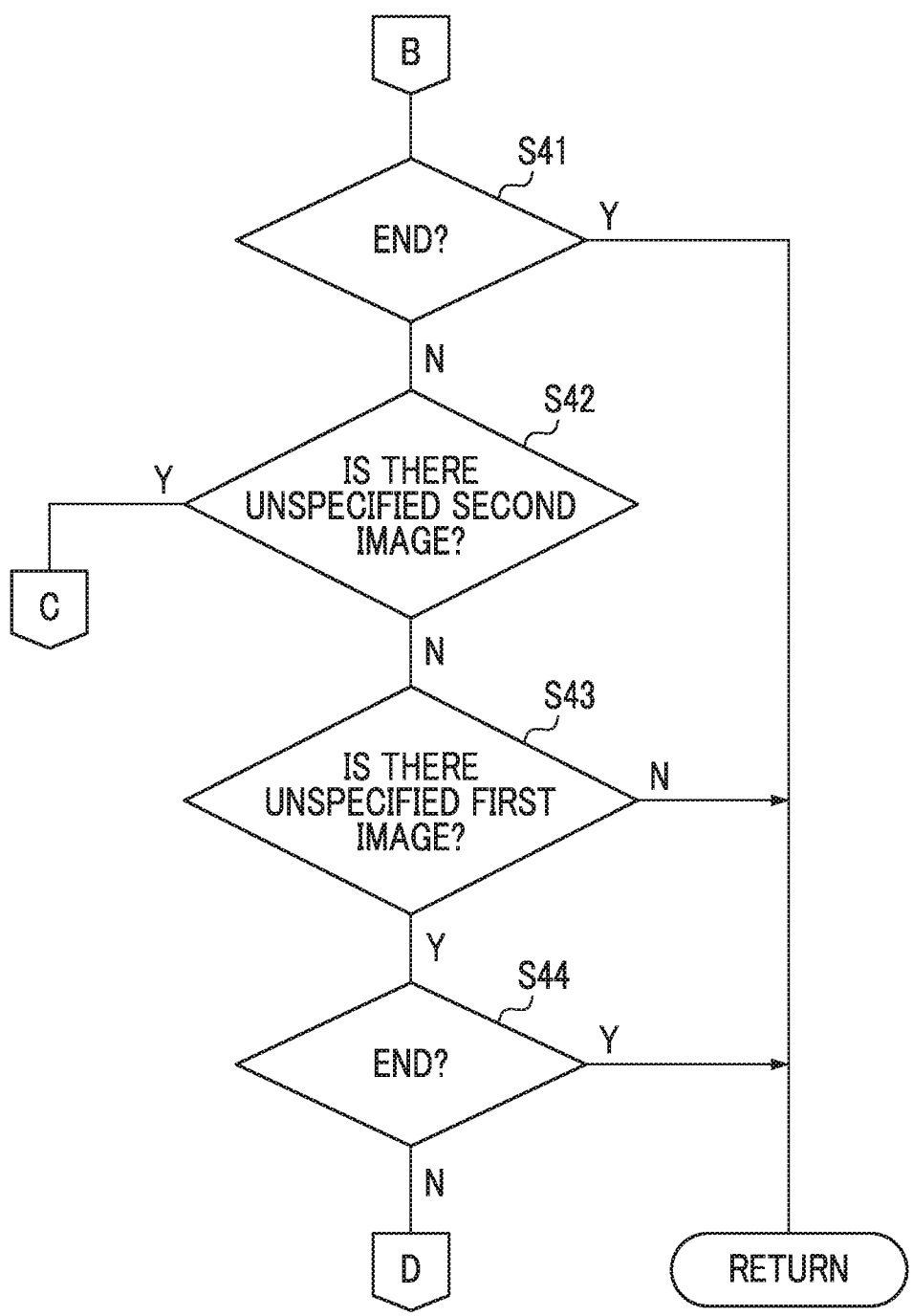
FIG. 6 is a flowchart illustrating a processing procedure of the storage server.

FIGS. 4 to 6 are flowcharts illustrating a processing procedure of the storage server 10 (image processing apparatus).

For example, the user U1 transmits an image reading command from a client computer 1 to the storage server 10, and the storage server 10 receives the image reading command. Then, an image file that represents the images P1 to P100 of the user U1 stored on the hard disk 18 is read by the hard disk drive 17 (an example of reading means) (step 31 in FIG. 4). A first image is specified from the images P1 to P100 by the CPU 11 (an example of first image specifying means) (step 32 in FIG. 4).

The first image may be an image that was first captured among the images P1 to P100, or may be any other image. Images including a person may be found from the images P1 to P100, and the first image may be specified from the images including the person. By transmitting the image file that represents the images P1 to P100 or an image file that represents the images including the person among the images P1 to P100 from the storage server 10 to the client computer 1 used by the user U1, displaying the images P1 to P100 or the images including the person among the images P1 to P100 on a display screen of a display device included in the computer 1, and causing the user U1 to select the first image using a mouse (which is an example of the first image specifying means) of the computer, the first image may be specified. In a case where the user U1 selects the first image, identification data of the first image is transmitted from the client computer 1 to the storage server 10 by a communication device of the client computer 1.

In a case where the first image is specified by the CPU 11 of the storage server 10 or the user U1, a person (a first person) included in the first image is recognized (detected) by the CPU 11 (an example of first person recognizing means) (step 33 in FIG. 4). In a case where the first image includes a plurality of persons, the plurality of persons are recognized by the CPU 11. Subsequently, the age of the first person at the time of capturing the first image is estimated by the CPU 11 (an example of first age estimating means) (step 34 in FIG. 4). In a case where data that represents the age is recorded in a header of an image file that represents the first image, the age may be known from the data, or the age of the first person may be estimated using AI (artificial intelligence) having a learning model for learning relationships between faces, body types, clothing and the like by reading a lot of images of persons whose ages are already known (for example, refer to techniques disclosed in JP2010-113526A, JP2010-257409A, or the like). However, in a case where there is information about the age of the first person in the first image (for example, in a case where the first person has a name tag indicating the school year), the age of the first person is estimated by the CPU 11 using the information.

Figure 7:
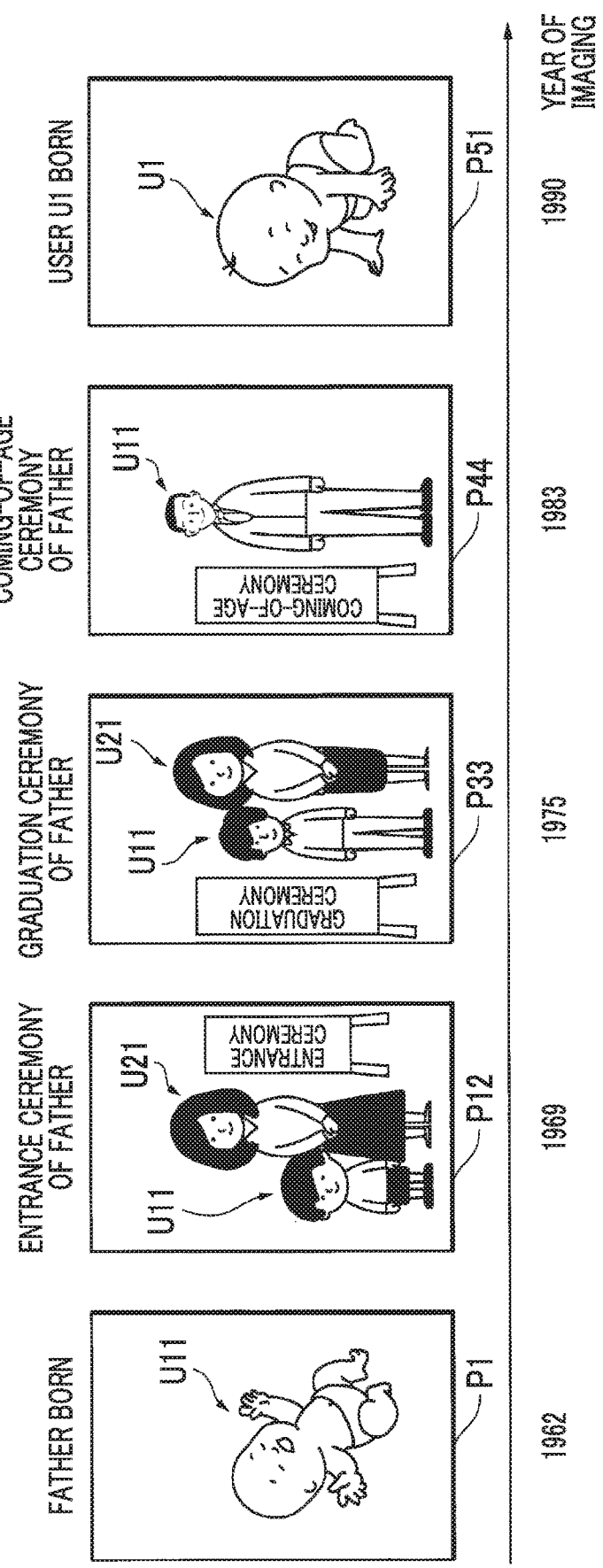
FIG. 7 shows an example of an image stored on the hard disk.
Figure 8:
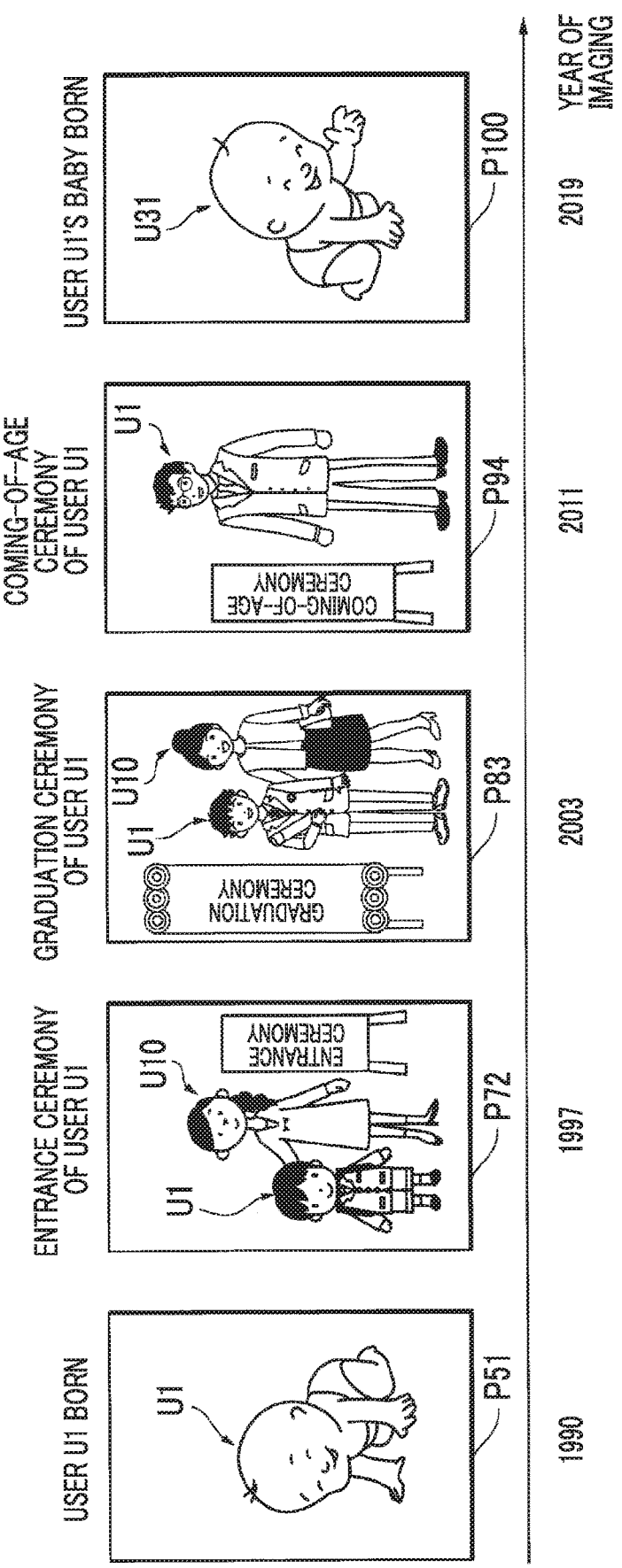
FIG. 8 shows an example of an image stored on the hard disk.

FIGS. 7 and 8 show some of the images P1 to P100 of the user U1. In FIGS. 7 and 8, some images are shown in the order of imaging years.

Referring to FIG. 7, the image P1 was captured in 1962, which is an image when a father U11 of the user U1 was born. The image P12 was captured in 1969, which is an image when the father U11 of the user U1 entered an elementary school. The image P12 shows the father U11 of the user U1 and a grandmother U21 of the user U1. The image P33 was captured in 1975, which is an image when the father of the user U1 graduated from the elementary school. The image P33 also shows the father U11 of the user U1 and the grandmother U21 of the user U1. The image P44 was captured in 1983, which is an image of the father of the user U1 at a coming-of-age ceremony. The image P51 was captured in 1990, which is an image when the user U1 was born, in which the user U1 is shown.

Referring to FIG. 8, the image P51 is the same as the image P51 shown in FIG. 7, which includes the user U1. The image P72 was captured in 1997, which is an image when the user U1 entered an elementary school. The image P72 shows the user U1 and a mother U10 of the user U1. The image P83 was captured in 2003, which is an image when the user U1 graduated from the elementary school. The image P83 also shows the user U1 and the mother U10 of the user U1. The image P94 was captured in 2011, which is an image of the user U1 at a coming-of-age ceremony. The image P100 was captured in 2019, which is an image when a child U31 of the user U1 was born, in which the child U31 of the user U1 is shown.

Imaging years of the images P1 to P100 may be known, in a case where data on the imaging years is recorded in a header of an image file that represents the image P1 to the image P100, from the data, and are estimated by analyzing the images in a case where the data on the imaging years is not recorded in the header of the image file. For example, in a case where an imaging date is imprinted in an image by an imaging date and time imprinting function at the time of imaging, the imaging date may be acquired by analysis. In a case where the imaging date is not imprinted, the imaging year may be estimated from a building that is a landmark, comparison between the degree of fading of a photo and digitized date and time, and the like. In addition, by reading a large number of images for which imaging dates are already known, it is possible to create a learning model for learning the presence of buildings that are landmarks, differences between the degrees of fading of photos and digitized dates and times, relationships between clothing, hairstyles, personal belongings, and the like of persons in the photos and imaging dates. The imaging years may be estimated by using AI including such a learning model (for example, refer to techniques disclosed in JP2010-026713A and JP2011-525017A).

As described above, the imaging date and time in the present invention include estimated date and time. The estimated date and time include date and time estimated in a case where an analog film print is digitized. A recording place of the estimated date and time may be a predetermined area of exchangeable image file format (Exif), or may be an area originally possessed by a variety of image management software or applications. In short, the date and time may be any settled or estimated imaging date and time of each image as long as the date and time can be accessed by the apparatus of the present invention.

For example, it is assumed that the image P72 at the entrance ceremony of the elementary school of the user U1 shown in FIG. 8 is specified by the CPU 11 or the user U1 as the first image. Since the image P72 includes the user U1 and the mother U10 of the user U1, an image in which a person imaged at the same age as the age of the user U1 or the mother U10 of the user U1 in the image P72 at the entrance ceremony of the elementary school is imprinted and in which a person other than the user U1 or the mother U10 of the user U1 is shown is found.

Referring to FIG. 5, a second image other than the first image P72 is specified from the images P1 to P100 of the user U1 by the CPU 11 (an example of second image specifying means) (step 35). Similarly to the first image, a person (a second person) included in the second image is recognized by the CPU 11 (an example of second image recognizing means) (step 36 in FIG. 5), and the age of the second person is estimated by the CPU 11 (an example of second age estimating means)(step 37 in FIG. 5). The age of the second person may also be known, in a case where data on the age is recorded in a header of an image file that represents the second image, from the data, and in a case where the data on the age is not recorded in the header of the image file, the CPU 11 may analyze the second image to estimate the age. The age estimation in the present invention may be performed by any of the following three methods.

(1) In a case where a person in an image is specified, and imaging date and time of the image and a birthday of the person are known, it is possible to accurately calculate the age (this is also included in the meaning of the term "age estimation" in the present invention).

(2) In a case where the birthday is known and the imaging year may be estimated by the above-described AI, it is possible to estimate the age.

(3) The age may be estimated from the face, height (estimated by comparison with another person, etc.), clothing, and the like of the person in the image using the above-described AI.

Subsequently, the CPU 11 (an example of person determining means) determines whether the first person and the second person are the same person (step 38 in FIG. 5). In a case where the first person and the second person are not the same person (NO in step 38 in FIG. 5), the CPU 11 (an example of age difference determining means) determines whether a difference between the age of the first person (a first age) and the age of the second person (a second age) is within a range of a threshold value (step 39 in FIG. 5). In a case where both the first person and the second person are plural and the number of persons are the same, it is determined that the plural first persons and the plural second persons are the same persons in a case where they are all the same. Although both the first person and the second person are plural, in a case where the number of the first persons and the number of the second persons are different, it is determined that the first persons and the second persons are not the same persons even in a case where the same person is included therein. When one of the first person and the second person is plural and one of the other person is single, it is determined that the first person and the second person are not the same person.

Further, in a case where the difference between the first age and the second age is within the range of the threshold value (for example, 2 years), a combination of the first image and the second image is determined (detected) by the CPU 11 (an example of image combination detecting means) (step 40 in FIG. 5). In a case where at least one of the first person or the second person is plural, the CPU 11 determines whether the difference between the first age and the second age is within the range of the threshold value in all combinations of the plural first persons and the plural second persons. In a case where the difference between the first age and the second age is within the range of the threshold value even in one combination, the CPU 11 determines that combination as the combination of the first image and the second image.

Referring to FIG. 8, in a case where the first image is specified by the CPU 11 or the user U1 as the image P72 captured when the user U1 entered the elementary school and the image P83 is specified by the CPU 11 as the second image, since the image P72 specified as the image includes the user U1 and the mother U10 of the user U1 and the image P83 specified as the second image includes the user U1 and the mother U10 of the user U1, the CPU 11 determines that the first persons and the second persons are the same persons. Accordingly, the image P72 specified as the first image and the image P83 specified as the second image are not determined by the CPU 11 as an image combination.

Referring to FIG. 8, in a case where the first image is specified by the CPU 11 or the user U1 as the image P72 captured when the user U1 entered the elementary school and the image P94 is specified by the CPU 11 as the second image, since the image P72 specified as the first image includes the user U1 and the mother U10 of the user U1 and the image P94 specified as the second image includes the user U1, the CPU 11 does not determine that the first persons and the second person are the same persons. Assuming that the age of the user U1 (the first age, which is the age at the time of capturing of the image P72) included in the image P72 specified as the first image is 6 and the age of the mother U10 of the user U1 (the first age, which is the age at the time of capturing of the image P72) is 32, and assuming that the age of the user U1 (the second age, which is the age at the time of capturing of the image P94) included in the image P94 specified as the second image is 20, the age difference does not fall within the range of the threshold value, so that the image P72 and the image P94 are not determined by the CPU 11 as a combination of the first image and the second image.

Assuming that the first image is specified by the CPU 11 or the user U1 as the image P72 captured when the user U1 entered the elementary school as shown in FIG. 8 and the image P12 is specified as the second image by the CPU 11 as shown in FIG. 7, since the image P72 specified as the first image includes the user U1 and the mother U10 of the user U1 and the image P12 specified as the second image includes the father U11 of the user U1 and the grandmother U21 of the user U1, the CPU 11 determines that the first persons and the second persons are not the same persons. Assuming that the age of the user U1 (the first age, which is the age at the time of imaging of the image P72) included in the image P72 specified as the first image is 6 and the age of the mother U10 of the user U1 (the first age, which is the age at the time of imaging for the image P72) is 32, and assuming that the age of the father U11 of the user U1 (the second age, which is the age at the time of imaging of the image P94) included in the image P12 specified as the second image is 6, the age difference is within the range of the threshold value regardless of the age of the grandmother U21, and thus, the image P72 and the image P12 are determined by the CPU 11 as a combination of the first image and the second image.

In a case where the first person and the second person are the same person (YES in step 38 in FIG. 5), or in a case where the difference between the first age and the second age is not within the range of the threshold value (NO in step 37 in FIG. 5), as the storage server 10 is set to continue processing until at least one image combination is found, a new second image is specified (YES in step 41 in FIG. 6, step 42), and the processing is continued under the control of the CPU 11 (an example of control means).

In a case where the storage server 10 is set so that the processing ends when at least one image combination is found, the combination of the first image and the second image is found (YES in step 41 in FIG. 6), and thus, the CPU 11 performs a control so that the processing of the storage server 10 ends. Even in a case where one image combination is found, if the storage server 10 is set to continue the processing, the processing is continued even in a case where the combination of the first image and the second image is found (NO in step 41 in FIG. 6).

In a case where an unspecified second image remains (YES in step 42 in FIG. 6), the next second image is specified by the CPU 11 (step 35 in FIG. 5), and as described above, the CPU 11 performs a control so that the processes of step 36 in FIG. 5 to step 42 in FIG. 6 are repeated. In a case where no unspecified second image remains (NO in step 42 in FIG. 6), even in a case where an unspecified first image remains (YES in step 43 in FIG. 6) and at least one image combination is found, as the storage server 10 is set to continue the processing without ending the processing (NO in step 44 in FIG. 6), the next first image is specified by the CPU 11 (step 32 in FIG. 4), and the CPU 11 performs a control so that the processes from step 33 in FIG. 4 are repeated.

In a case where at least one image combination is detected, even in a case where a setting is performed so that the processing of the storage server 10 ends (YES in step 41 in FIG. 6), there is no unspecified first image (NO in step 43 in FIG. 6), or the unspecified first image remains, as the storage server 10 is set to end the processing (YES in 44 in FIG. 6), the processes shown in FIGS. 4 to 6 end.

In the above-described embodiment, the processing of the storage server 10 ends in a case where at least one image combination is detected (YES in step 41 in FIG. 6), but the processes from step 32 may be performed by changing the specified first image without ending the processing. One image combination of the first image and the second image is determined for each first image.

Figure 9:
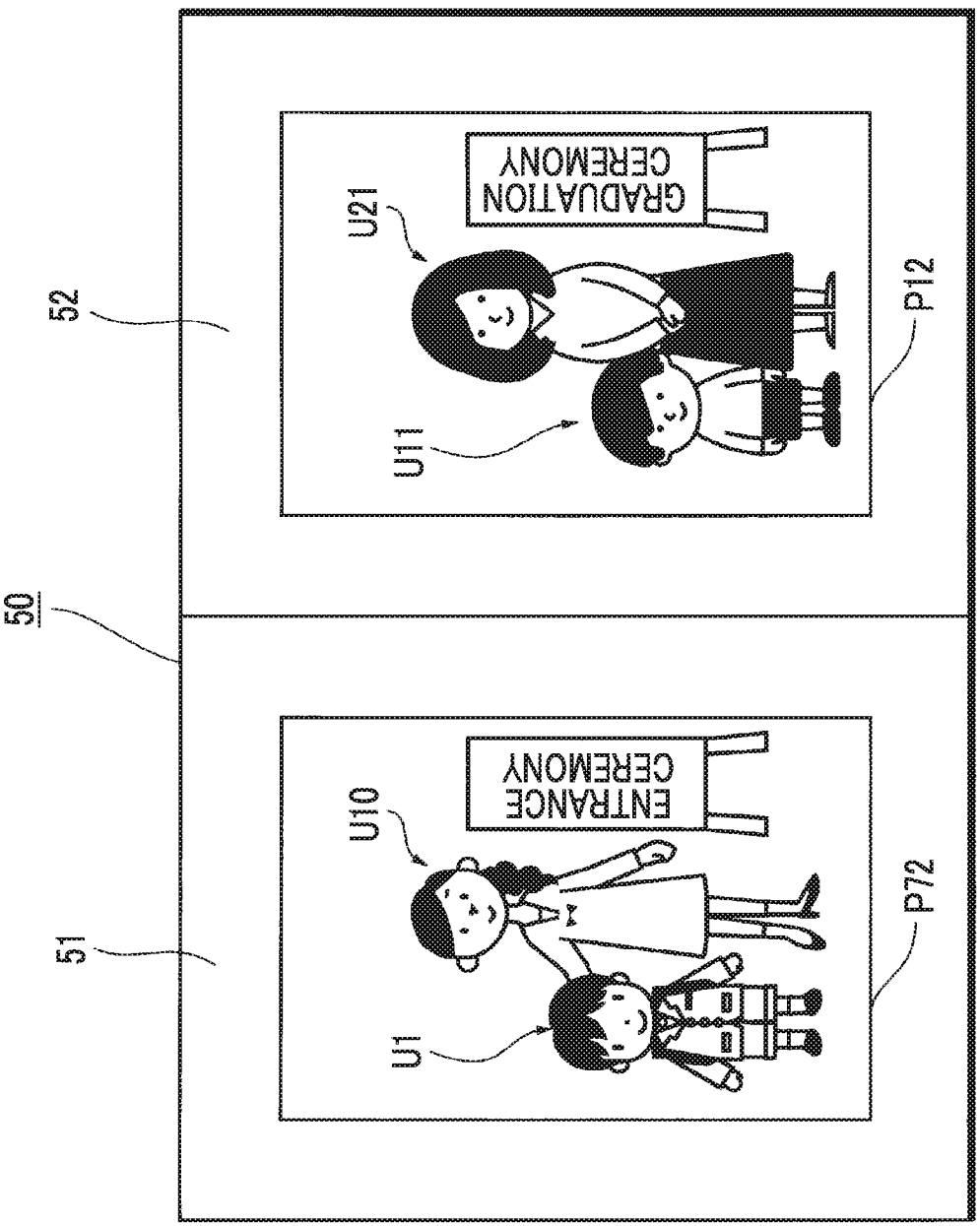
FIG. 9 shows an example of a print.

FIG. 9 shows an example of a print printed by the printer server 20.

As described above, it is assumed that the image P12 and the image P72 are determined as the image combination of the first image and the second image. An image file that represents the first image, an image file that represents the second image, and a print command are transmitted to the printer server 20 under the control of the CPU 11 (an example of printer control means). A print 50 is printed in the printer server 20. The image P72 specified as the first image is printed in a left area 51 of the print 50, and the image P12 specified as the second image is printed in a right area 52 of the print 50.

The image P72 is an image taken when the user U1 was 6 years old, which is an image of the user U1 at the entrance ceremony of the elementary school. The image P12 is an image captured when the father U11 of the user U1 was 6 years old, which is an image of the father U11 of the user U1 at the entrance ceremony of the elementary school.

The print 50 is obtained in which the images P12 and P72 of the parent and child captured at the same age are printed adjacently by the printer server 20. The print 50 is mailed to the user U1, for example.

In the example shown in FIG. 9, the print 50 in which the images P12 and P72 are printed adjacently is shown, but image files that respectively represents the images P12 and P72 (or an image file that represents the images P12 and P72 as one adjacent image), and a command for displaying the images P12 and P72 to be adjacent to each other on a display screen of a display device included in the client computer 1 may be generated in the CPU 11 (an example of display control means) of the storage server 10, and the image files and the command may be transmitted from the storage server 10 to the client computer 1. The images P12 and P72 are displayed adjacently on the display screen of the display device included in the client computer 1. The CPU 11 (which is an example of display control means) may perform a control so that the images P12 and P72 are displayed adjacently on the display screen of the display device 19A of the storage server 10.

According to this embodiment, it is possible to find images of different persons captured at the same age. In the above embodiment, the image of the user U1 and the image of the father U11 of the user U1 captured at the same age as the user's age at the time when the image of the user U1 was captured (the age difference may be within the range of the threshold value) are found, but as well as the image of the father and the image of the child captured at the same age, images of brothers captured at the same age may be found.

In the above-described embodiment, all the images stored on the hard disk 18 may be images of relatives or affines of the user. The first image and the second image to be detected are only images of relatives or affines, such as parents, children, brothers, sisters, or cousins.

MODIFICATION EXAMPLE

Figure 10:
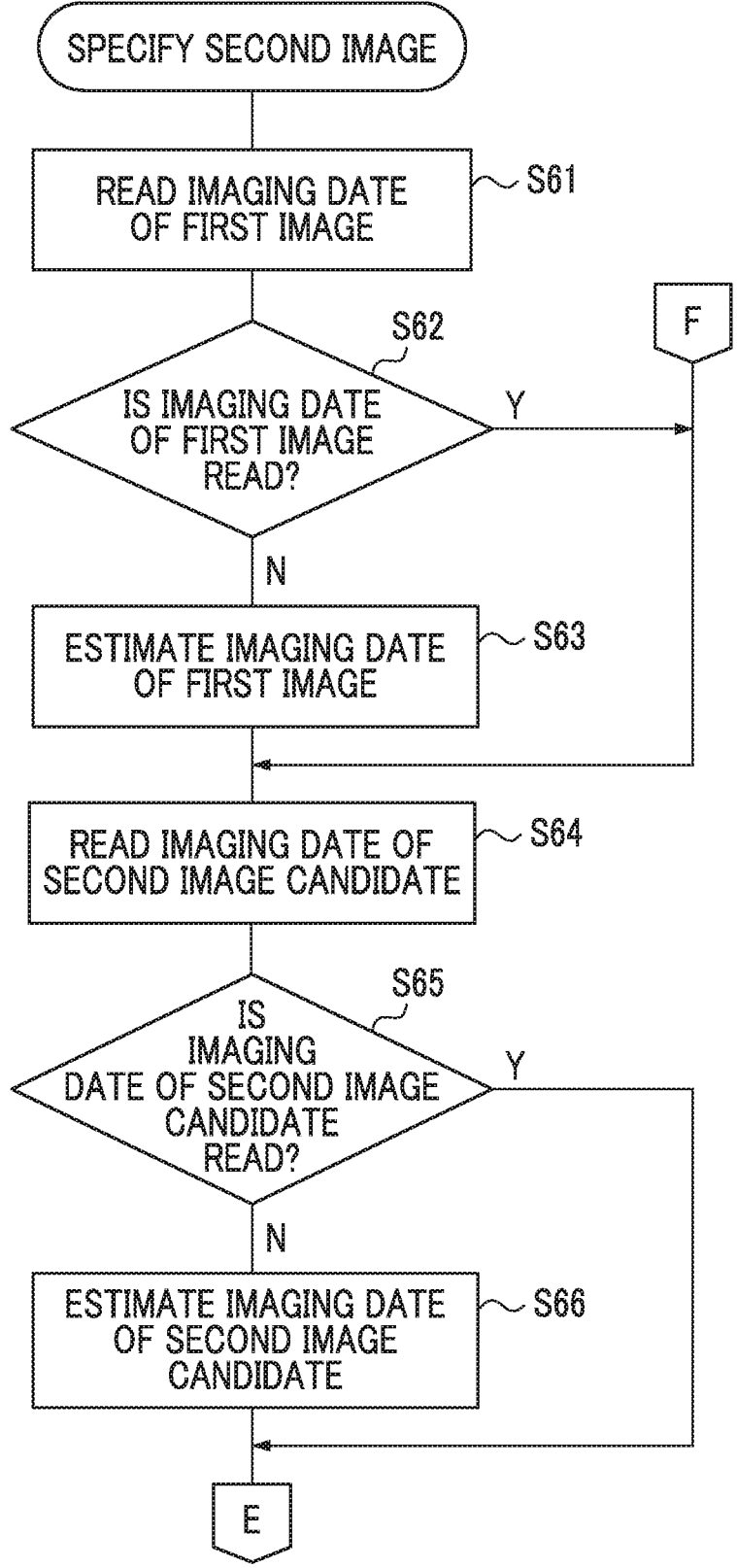
FIG. 10 is a flowchart illustrating a procedure for specifying a second image.
Figure 11:
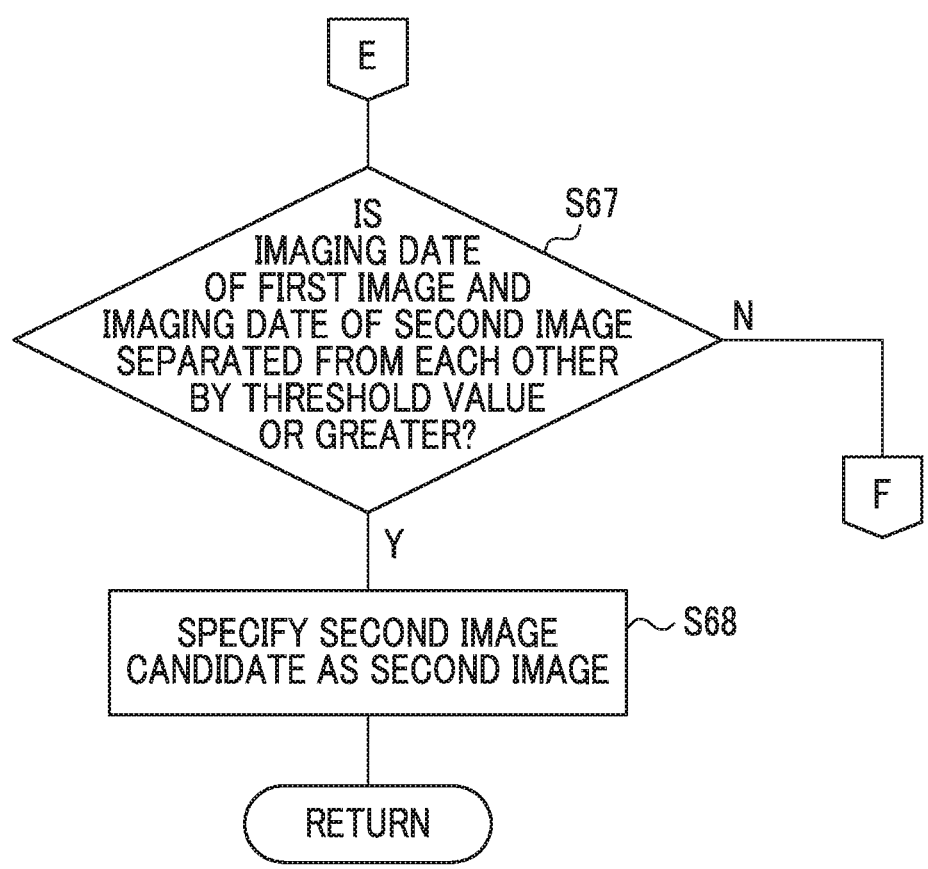
FIG. 11 is a flowchart illustrating a procedure for specifying a second image.

FIG. 10 and FIG. 11 are flowcharts showing a processing procedure for specifying the second image. A process shown in FIGS. 10 and 11 corresponds to the process of step 35 in FIG. 5.

In the process shown in FIGS. 10 and 11, the CPU 11 determines an image on an imaging date separated from the imaging date of the first image by a threshold value or greater as the second image.

A specified imaging date of the first image is read by the CPU 11 from the header of the image file that represents the first image (step 61). In a case where the imaging date of the first image can not be read (NO in step 62), the imaging date of the first image is estimated by the CPU 11 (step 63). The imaging date may be estimated using AI, or, in a case where the first image includes a subject whose imaging date can be estimated, the imaging date is estimated using the subject.

A second image candidate is specified by the CPU 11 from images other than the first image, and the imaging date of the second image candidate is read by the CPU 11 from the header of the image file that represents the second image (step 64). In a case where the imaging date of the second image candidate cannot be read (NO in step 65), the imaging date of the second image candidate is estimated by the CPU 11 (step 66). With respect to the second image candidate, similarly, the imaging date may be estimated using AI, or in a case where the second image candidate includes a subject whose imaging date can be estimated, the imaging date is estimated using the subject.

In a case where the imaging date of the first image and the imaging date of the second image candidate are separated from each other by the threshold value or greater (for example, 100 days or another value) (YES in step 67), the second image candidate is specified by the CPU 11 as the second image (step 68). In a case where the imaging date of the first image and the imaging date of the second image candidate are not separated from each other by the threshold value or greater (NO in step 67), another second image candidate is specified by the CPU 11, and its imaging date is read (step 64). The second image candidate may be specified in any manner, and may be random in the order of imaging.

Figure 12:
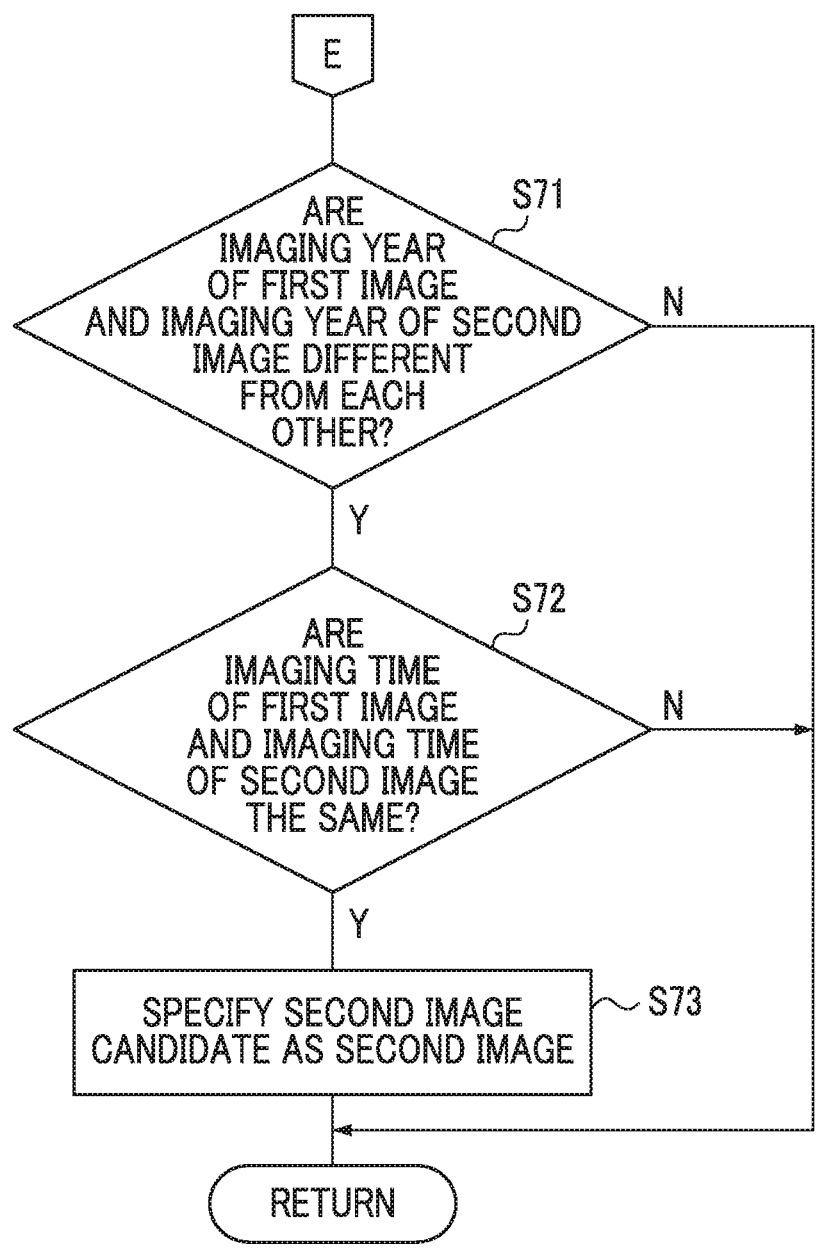
FIG. 12 is a flowchart illustrating a procedure for specifying a second image.

FIG. 12 is a flowchart illustrating a processing procedure of a part of the process of specifying the second image, which corresponds to the processing procedure of FIG. 11. The processing procedure shown in FIG. 12 is realized in accordance with the processing procedure shown in FIG. 10.

In FIG. 12, the CPU 11 determines whether an imaging year of the first image and an imaging year of the second image candidate are different from each other (step 71). In a case where the imaging year of the first image and the imaging year of the second image candidate are different from each other (YES in step 71), the CPU 11 determines whether the imaging time of the first image and the imaging time of the second image candidate are the same (step 72). In a case where the imaging times are the same (YES in step 72), the CPU 11 specifies the second image candidate as the second image (step 73).

It is possible to find the first and second images captured at an event performed at the same period, such as an entrance ceremony, and thus, it is possible to find images of the parent's entrance ceremony or graduation ceremony and images of the child's entrance ceremony or graduation ceremony as described above, images of an elder brother's entrance ceremony or graduation ceremony and images of a younger brother's entrance ceremony or graduation ceremony, or the like. The same period refers to a period generally felt as the same period, for example, the same season, the same month, or the like.

Figure 13:
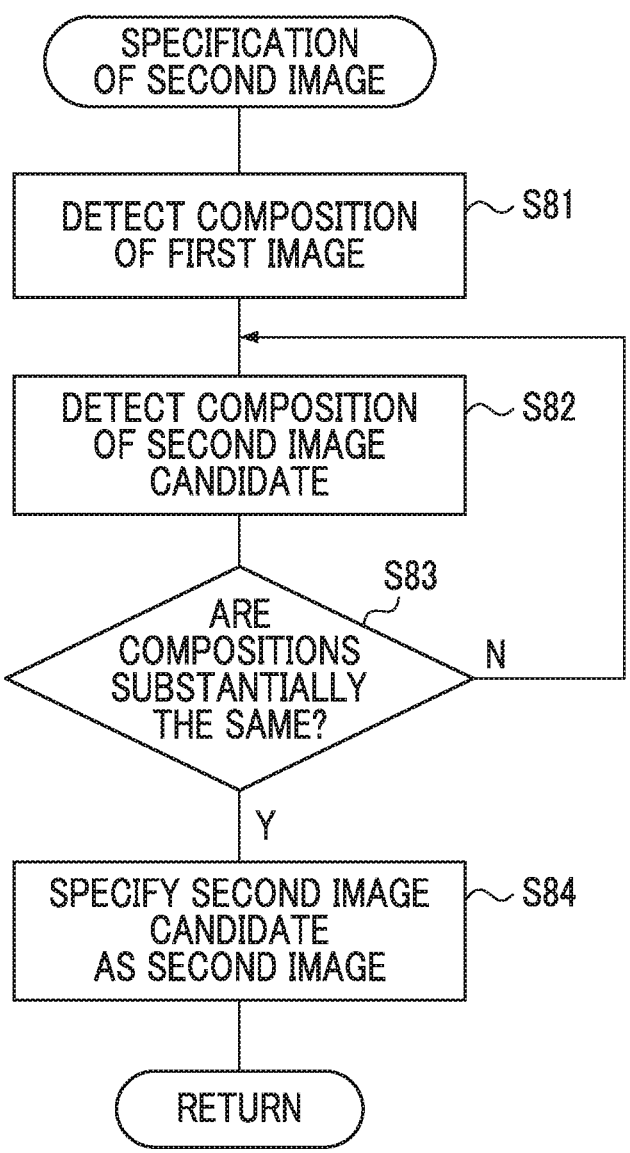
FIG. 13 is a flowchart illustrating a procedure for specifying a second image.

FIG. 13 is a flowchart illustrating a processing procedure for specifying the second image. A process shown in FIG. 13 also corresponds to the process of step 35 in FIG. 5.

In the processing procedure shown in FIG. 13, an image having a composition similar to a composition of the first image is used as the second image.

The composition of the first image specified by the CPU 11 is detected by the CPU 11 (step 81). A large number of composition samples may be stored, and composition detection may be performed by matching with the composition samples. Further, the position, the type, the size, or the like of a subject included in the image may be detected, and composition detection may be performed on the basis of the detected position, type, size, or the like of the subject. In particular, the composition may be detected by placing importance on the position, the size or the like of a person. Subsequently, a second image candidate is specified by the CPU 11, and a composition of the specified second image candidate is also detected by the CPU 11 (step 82).

The composition of the first image is compared with the composition of the second image candidate by the CPU 11, and in a case where the two compositions are approximately the same (the degree of coincidence of the compositions is equal to or greater than a threshold value) (YES in step 83), the second image candidate is specified by the CPU 11 as the second image (step 84). In a case where the composition of the first image is not approximately the same as the composition of the second image candidate (NO in step 83), a new second image candidate is specified by the CPU 11, and a composition of the new second image candidate is detected by the CPU 11 (step 82). The first image is compared with the composition of the new second image candidate.

It is possible to find images of different persons captured in the same age, which have the same composition.

Figure 14:
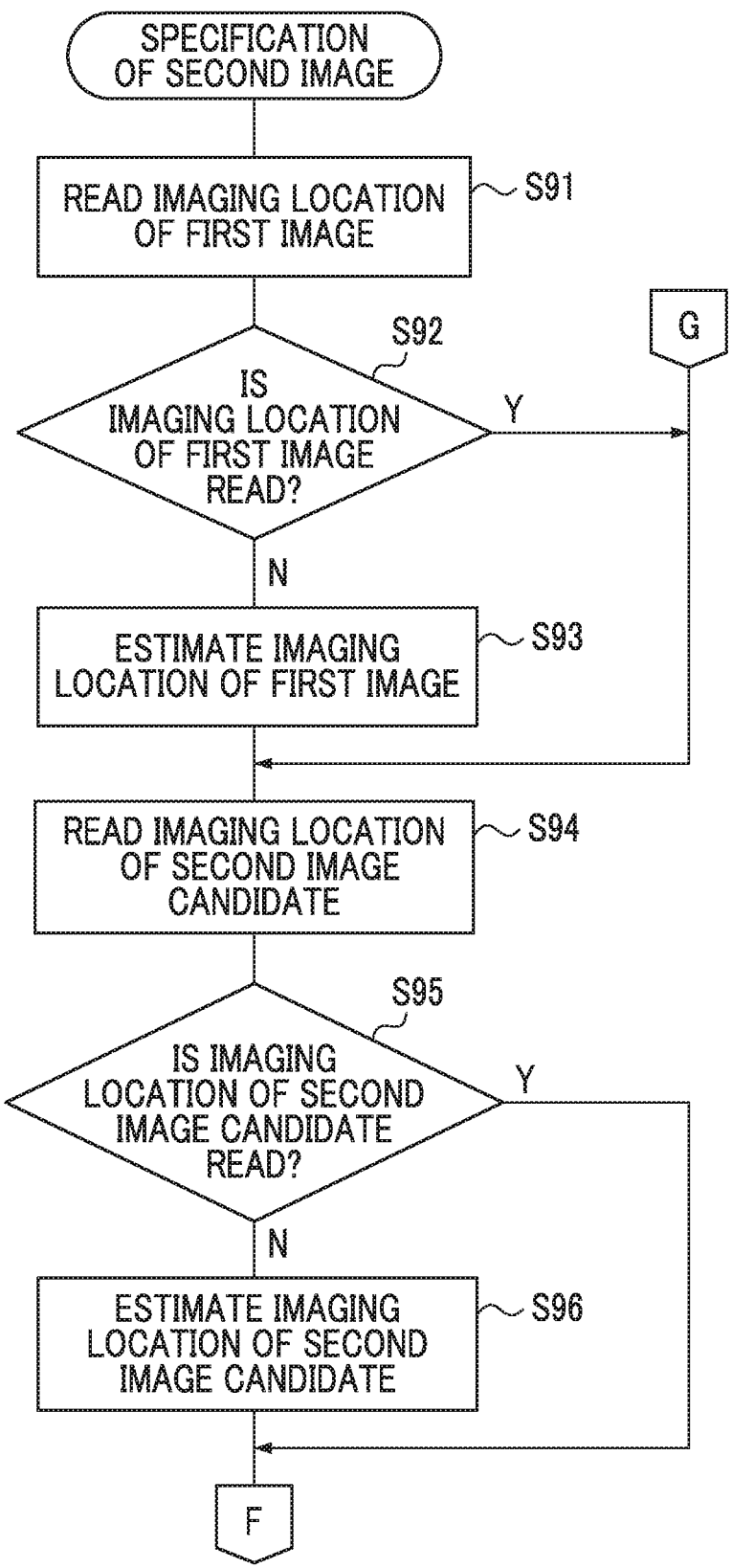
FIG. 14 is a flowchart illustrating a procedure for specifying a second image.
Figure 15:
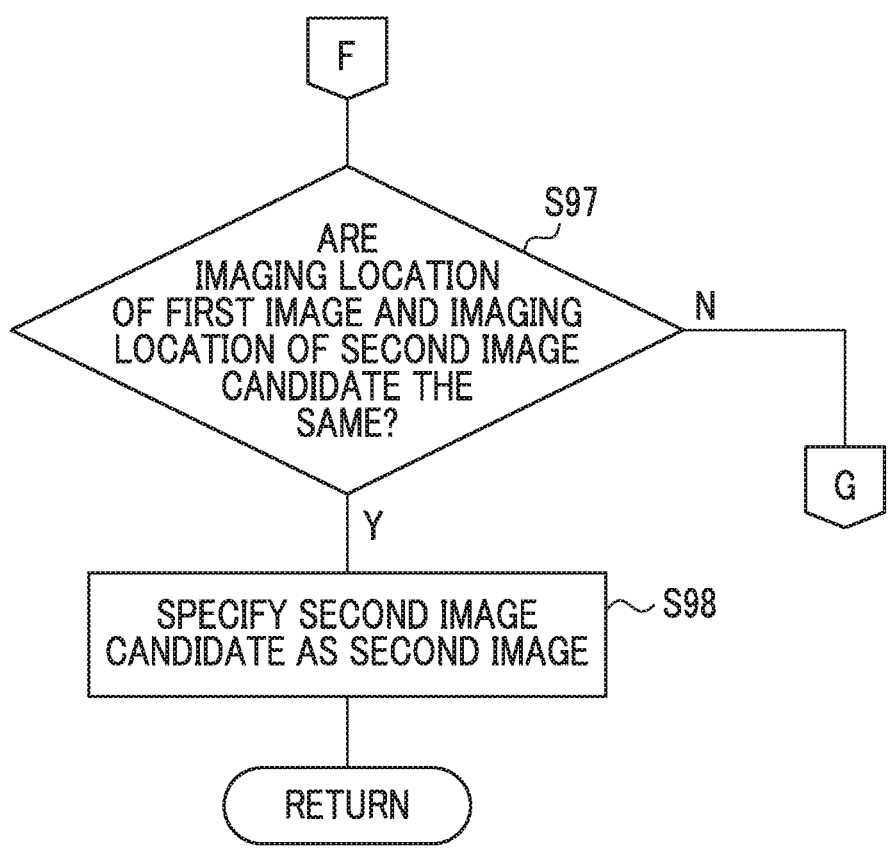
FIG. 15 is a flowchart illustrating a procedure for specifying a second image.

FIGS. 14 and 15 are also flowcharts illustrating a processing procedure for specifying the second image. A process shown in FIGS. 14 and 15 also corresponds to the process of step 35 in FIG. 5.

The process shown in FIGS. 14 and 15 is a process of setting an image at the same imaging location as an imaging location of the first image as the second image.

The imaging location of the first image (such as GPS (Global Positioning System) data indicating an imaging position) is read by the CPU 11 from the header of the image file that represents the first image (step 91). In a case where the imaging location of the first image cannot be read by the CPU 11 from the header of the image file that represents the first image due to the reason that the imaging location is not recorded in the header, for example (NO in step 92), the imaging location of the first image is estimated by the CPU 11 (step 93). For example, in a case where the first image includes an address display, a subject that is a feature indicating and a location, or the like, the imaging location is estimated by the CPU 11 from such a subject.

A second image candidate is specified by the CPU 11, and an imaging location of the second image candidate is read by the CPU 11 from a header of an image file that represents the second image candidate (step 95). In a case where the imaging location of the second image candidate cannot be read by the CPU 11 from the header of the image file that represents the second image candidate due to the reason that the imaging location is not recorded in the header, for example (NO in step 95), the imaging location of the second image candidate is estimated by the CPU 11 (step 96).

In a case where the imaging location of the first image and the imaging location of the second image candidate are the same (which includes a case where the two imaging locations are regarded as the same) (YES in step 97), the second image candidate is specified by the CPU as the second image (step 98). In a case where the imaging location of the first image and the imaging location of the second image candidate are not the same (NO in step 97), a new second image candidate is specified by the CPU 11, and an imaging location of the specified new second image candidate is read or estimated (steps 94 and 96). The imaging location of the first image is compared with the imaging location of the new second image candidate (step 97).

It is possible to find images of different persons captured at the same age, which have the same imaging location. For example, in a case where a parent and child attend the same school, it is possible to find images of the child's entrance ceremony and graduation ceremony at the same school and images of the child's parent's entrance ceremony and graduation ceremony at the same school.

Figure 16:
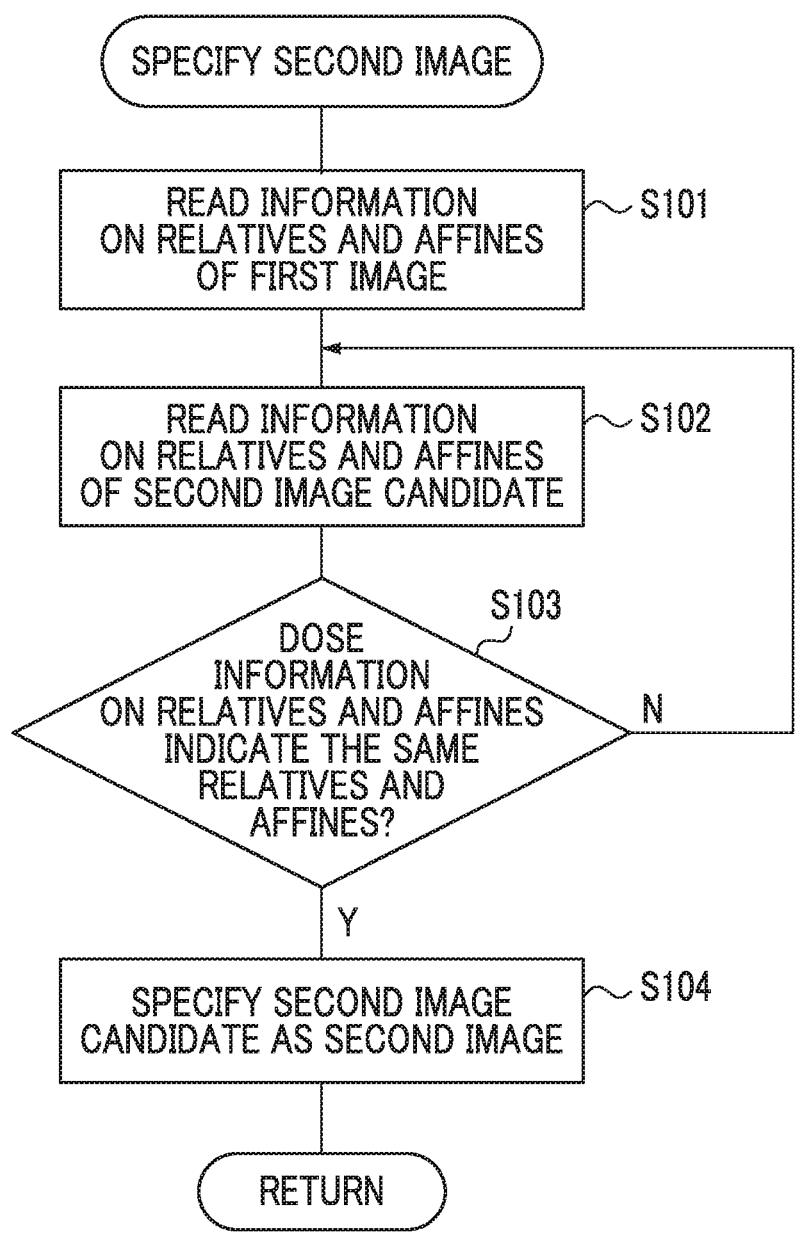
FIG. 16 is a flowchart showing a procedure for specifying a second image.

FIG. 16 is also a flowchart illustrating a processing procedure for specifying the second image. A process shown in FIG. 16 also corresponds to the process of step 35 in FIG. 5.

The process shown in FIG. 16 is a process of specifying, as the second image, an image including at least one of relatives or affines of a person included in the first image.

Information on relatives or affines related to the first image is read by the CPU 11 from the header of the image file that represents the first image (step 101). A second image candidate is specified by the CPU 11, and information on the relatives or affines of a person included in the second image candidate is read by the CPU 11 from a header of an image file that represents the second image candidate (step 102).

From the information on the relatives or affines obtained from the first image and the information on the relatives or affines obtained from the second image candidate, the CPU 11 identifies whether or not the person included in the first image and the person included in the second image candidate indicate at least one of the same relatives or the same affines (step 103). In a case where the persons indicate at least one of the same relatives or the same affines (YES in step 103), the CPU 11 specifies the second image candidate as the second image (step 104). In a case where the persons do not indicate the same relatives and the same affines (NO in step 103), a new second image candidate is specified by the CPU 11, and the CPU 11 identifies whether or not the person included in the first image and a person included in the second image candidate indicate at least one of the same relatives or the same affines, with respect to the new second image candidate (step 103).

In the above-described embodiment, the CPU 11 identifies whether or nor the person included in the first image and the person included in the second image candidate indicate at least one of the same relatives or the same affines using the information on the relatives and marriages recorded in the header of the image file, but data indicating facial images for relatives and affines of a certain user may be stored in the hard disk 18 of the storage server 10 in advance in correspondence with the user, and it may be determined whether or not the person included in the first image and the person included in the second image candidate indicate at least one of the relatives or the affines using the data indicating the facial images, using AI.

Figure 17:
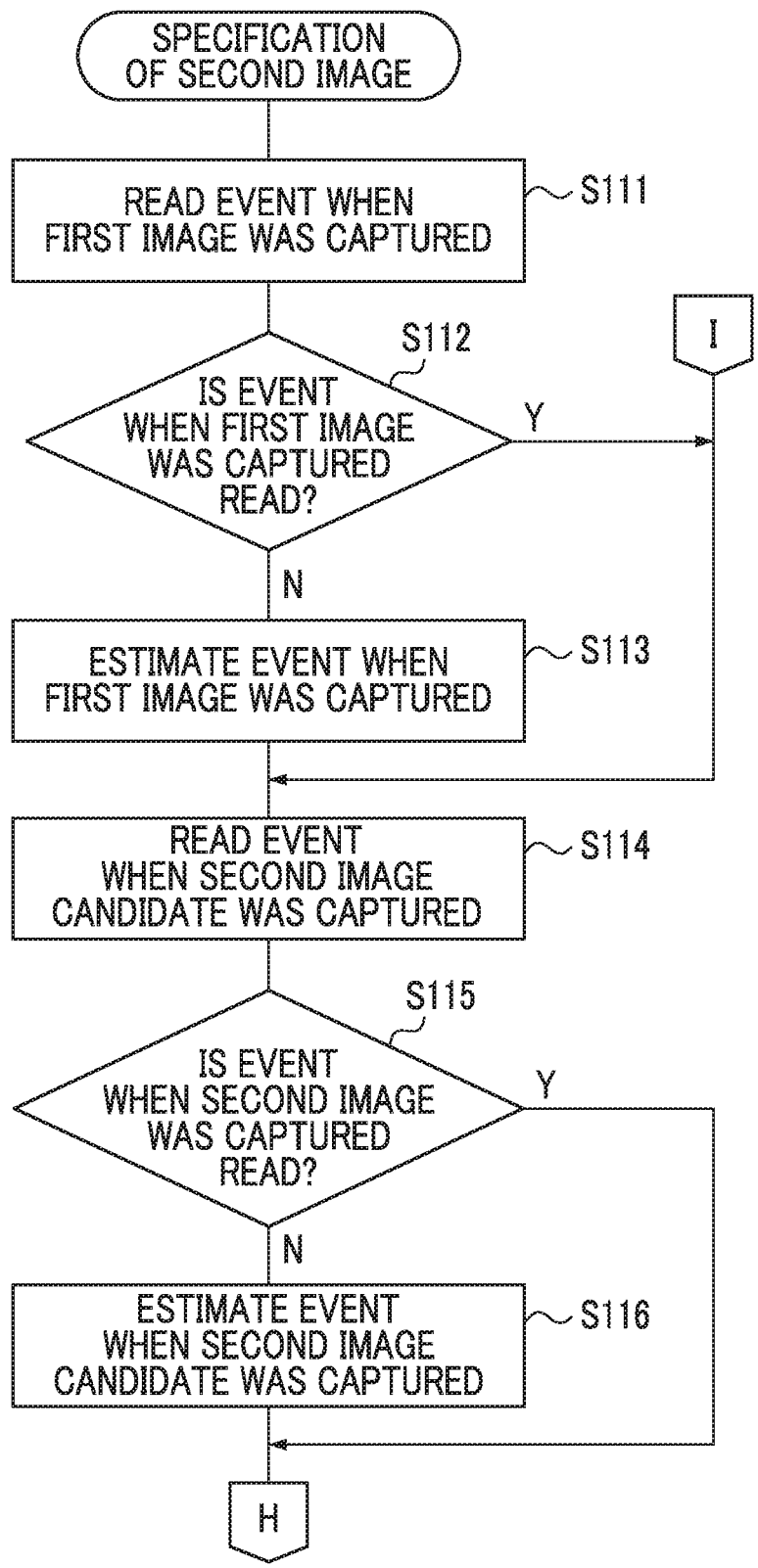
FIG. 17 is a flowchart illustrating a procedure for specifying a second image.
Figure 18:
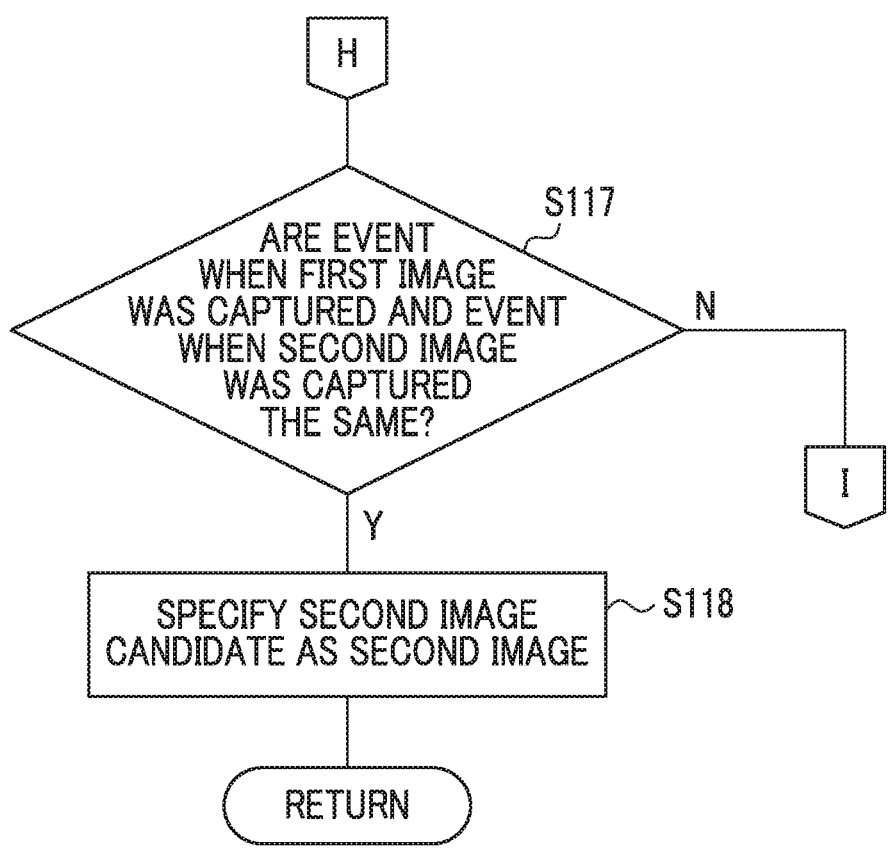
FIG. 18 is a flowchart illustrating a procedure for specifying a second image.

It is possible to find images of persons of relatives and marriages captured in the same age, FIG. 17 and FIG. 18 are also flowcharts illustrating a processing procedure for specifying the second image. A process shown in FIGS. 17 and 18 also corresponds to the process of step 35 in FIG. 5.

The process shown in FIGS. 17 and 18 is a process for specifying an image of the same event as an event indicated by the first image as the second image.

The event indicated by the first image is read by the CPU 11 from the header of the image file that represents the first image (step 111). In a case where the event indicated by the first image cannot be read by the CPU 11 from the header of the image file that represents the first image due to the reason that no event is recorded in the header, for example (NO in step 112), the event of the first image is estimated by the CPU 11 (step 113). For example, in a case where a subject that represents an event, an event name, or the like is included in the first image, the event is estimated by the CPU 11 from the subject or the event name.

A second image candidate is specified by the CPU 11, and an event indicated by the second image candidate is read by the CPU 11 from a header of an image file that represents the second image candidate (step 114). In a case where the event indicated by the second image candidate cannot be read by the CPU 11 from the header of the image file that represents the second image candidate due to the reason that the event is not recorded in the header, for example (NO in step 115), the event indicated by the second image candidate is estimated by the CPU 11 (step 116).

In a case where the event indicated by the first image is the same as the event indicated by the second image candidate (which includes a case where the two events are regarded as the same) (YES in step 117), the second image candidate is specified by the CPU 11 as the second image (step 118). In a case where the event indicated by the first image and the event indicated by the second image candidate are not the same (NO in step 117), a new second image candidate is specified by the CPU 11, and an event indicated by the specified new second image candidate is read or estimated (steps 114 and 116). The event indicated by the first image is compared with the event represented by the new candidate second image (step 117).

It is possible to find images of different persons captured at the same age, which indicate the same event.

Figure 19:
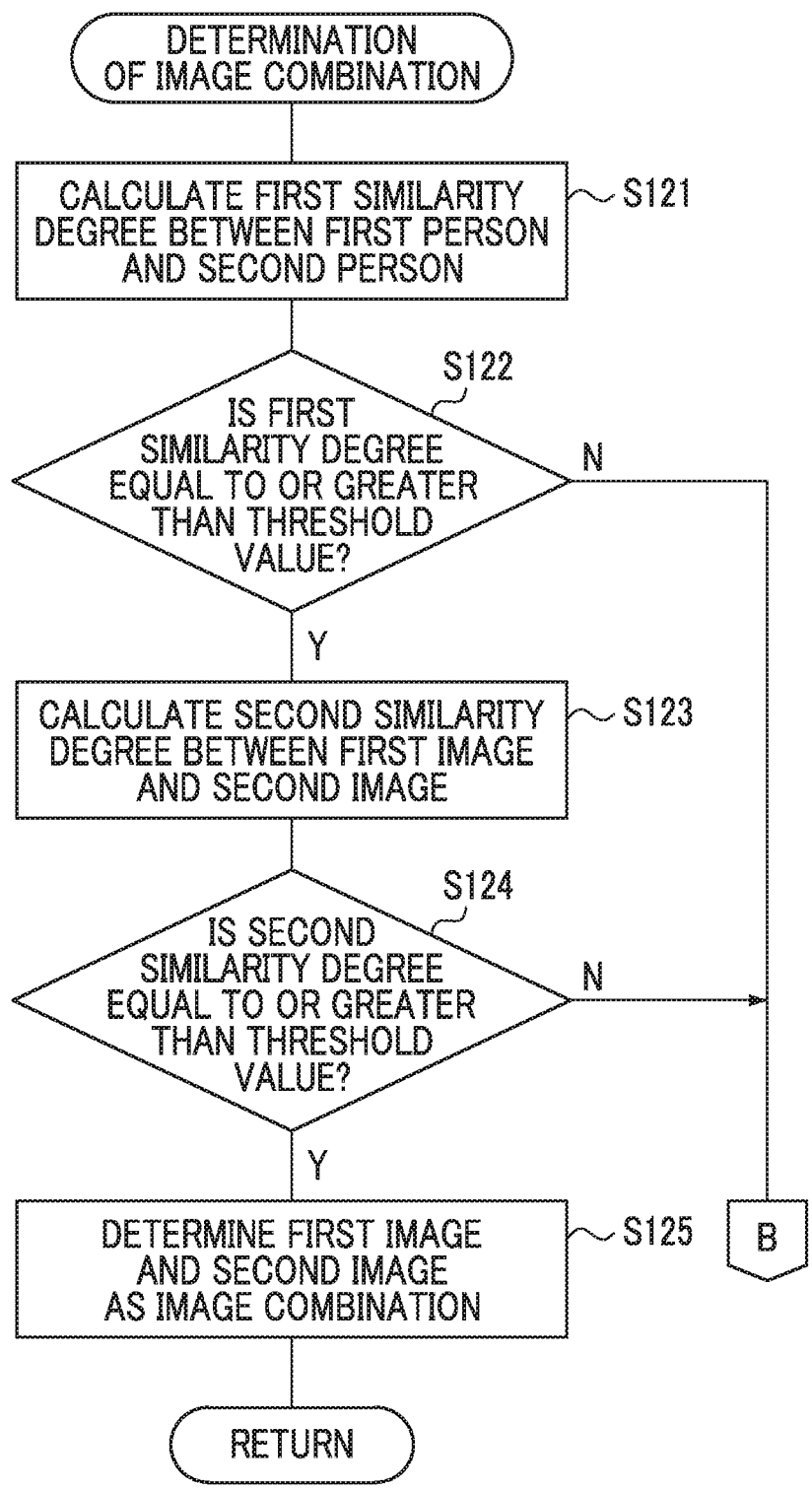
FIG. 19 is a flowchart illustrating a procedure for determining an image combination.

FIG. 19 is a flowchart illustrating a processing procedure for determining an image combination of the first image and the second image. A process shown in FIG. 19 corresponds to the process of step 40 in FIG. 5.

The process shown in FIG. 19 is a process of determining a first image and a second image as an image combination in a case where a first person included in the first image and a second person included in the second image are similar and the first image and the second image are similar. In a case where the first image and the second image are not similar but the first person included in the first image and the second person included in the second image are similar, the first image and the second image may be determined as an image combination, or in a case where the first person included in the first image and the second person included in the second image are not similar but the first image and the second image are similar, the first image and the second image may be determined as an image combination.

The first person is detected by the CPU 11 from the first image, the second person is detected by the CPU 11 from the already specified second image (step 35 in FIG. 5), and a first similarity degree indicating a similarity degree between the first person and the second person is calculated by the CPU (step 121). In a case where the calculated first similarity degree is less than a first threshold value (NO in step 122), it is considered that the first person and the second person are not similar (for example, not relatives but others), and another second image is newly specified by the CPU 11.

In a case where the calculated first similarity degree is equal to or greater than the first threshold (YES in step 122), it is considered that the first person and the second person are similar (for example, relatives), and a second similarity degree indicating a similarity degree between the first image and the second image is calculated by the CPU 11 (step 123). In a case where the calculated second similarity degree is less than a second threshold (NO in step 124), it is considered that the first similarity degree and the second similarity degree are not similar, and another second image is newly specified by the CPU 11.

In a case where the calculated second similarity degree is equal to or greater than the second threshold value (YES in step 124), it is considered that the first similarity degree and the second similarity degree are similar, and an image combination of the first image and the second image is determined by the CPU 11 (step 125).

It is possible to determine an image combination of a first image and a second image that are images of different persons, captured in the same age and include a first person and a second person similar to the first person, in which the image combination is similar to both the first image and the second image.

In the above embodiment, it is assumed that an administrator of the image processing system obtains a consent from a user to analyze an image of the user.

A processing unit that executes the above-described processing includes the CPU 11 that executes software to function as various processing units, and also, includes a programmable logic device of which a circuit configuration is changeable after manufacturing, such as a field-programmable gate array (FPGA), a dedicated electric circuit that is a processor having a circuit configuration specifically designed to execute a specific process, such as an application specific integrated circuit (ASIC).

One processing unit may be configured of one of these various processors, or may be configured of a combination of two or more processors of the same type or different types (for example, a plurality of FPGAs, a combination of a CPU and an FPGA). As an example in which a plurality of processing units is configured by one processor, first, as represented by a computer such as a client computer or a server, there is a form in which one processor is configured by a combination of one or more CPUs and software and the processor functions as a plurality of processing units. Second, as represented by a system-on-a-chip, there is a form in which a processor that realizes functions of an entire system including a plurality of processing units with one integrated circuit (IC) chip is used. As described above, the various processing units are configured using one or more various processors as a hardware structure.

Further, the hardware structure of these various processors is, more specifically, an electric circuit in which circuit elements such as semiconductor elements are combined.

EXPLANATION OF REFERENCES

1-*n*: Computer
10: Storage server
11: CPU
12: Communication device
13: Memory card reader/writer
14: Memory card
15: Compact disc drive
16: Compact disc
17: Hard disk drive
18: Hard disk
19: Memory
19A: Display device
20: Printer server
50: Print
51: Left area of print
52: Right area of printer
P1-P300: Image
U1-U3: User
U10: Mother
U11: Father
U21: Grandmother
U31: Children

What is claimed is:
1. An image processing apparatus comprising:
a reading device for reading an image from a recording device in which a plurality of images accessible by one user are recorded;
a first image specifying device for specifying any one of the plurality of images as a first image;
a first person recognizing device for recognizing a first person included in the first image;
a first age estimating device for estimating a first age of the first person at date and time of imaging for the first image;
a second image specifying device for specifying any one of the plurality of images other than the first image as a second image;
a second person recognizing device for recognizing a second person included in the second image;
a second age estimating device for estimating a second age of the second person at date and time of imaging for the second image;
an age difference determining device for determining whether or not a difference between the estimated first age and the estimated second age is within a range of a threshold value; and
an image combination detecting device for detecting the first image and the second image as an image combination in a case where it is determined by the age difference determining device that the difference between the first age and the second age is within the range of the threshold value, wherein the first person is different from the second person.

2. The image processing apparatus according to claim 1, wherein the second image specifying device specifies an image whose imaging date is separated from the imaging date of the first image by a threshold value or greater as the second image.

3. The image processing apparatus according to claim 1, wherein the second image specifying device specifies an image captured at the same period as an imaging period of the first image, in a year different from a year when the first image was captured, as the second image.

4. The image processing apparatus according to claim 1, wherein the second image specifying device specifies an image having the same composition as a composition of the first image as the second image.

5. The image processing apparatus according to claim 1, wherein the second image specifying device specifies an image captured at the same location as a location where the first image was captured, as the second image.

6. The image processing apparatus according to claim 1, wherein the second image specifying device specifies an image in which a relative or an affine of a person included in the first image is included, as the second image.

7. The image processing apparatus according to claim 1, wherein the second image specifying device specifies an image captured at the same event as an event when the first image was captured, as the second image.

8. The image processing apparatus according to claim 1, further comprising:
a control device for controlling the image processing apparatus to repeat at least one of specification of the first image or specification of the second image until at least one image combination is detected.

9. The image processing apparatus according to claim 1, further comprising:
a similarity degree calculating device for calculating at least one of a first similarity degree between the first person and the second person or a second similarity degree between the first image and the second image,
wherein the image combination detecting device detects the first image and the second image as the image combination in a case where at least one of the first similarity degree or the second similarity degree is equal to or greater than a threshold value.

10. The image processing apparatus according to claim 1, wherein the recording device has a plurality of images showing relatives or affines of a specific person recorded thereon.

11. The image processing apparatus according to claim 1, further comprising:
a display control device for controlling a display device to display the first image and the second image to be adjacent to each other.

12. The image processing apparatus according to claim 1, further comprising:
a printer control device for controlling a printer to print the first image and the second image to be adjacent to each other.

13. The image processing apparatus according to claim 1, wherein the first image specifying device specifies the first image in accordance with a command from a user.

14. An image processing apparatus comprising:
a reading device for reading an image from a recording device in which a plurality of images accessible by one user are recorded; and a processor,
in which the processor may perform processes of
specifying any one of the plurality of images as a first image,
recognizing a first person included in the first image,
estimating a first age of the first person at date and time of imaging for the first image,
specifying any one of the plurality of images other than the first image as a second image,
recognizing a second person included in the second image,
estimating a second age of the second person at date and time of imaging for the second image,
determining whether or not a difference between the estimated first age and the estimated second age is within a range of a threshold range, and
detecting the first image and the second image as an image combination in a case where it is determined that the difference between the first age and the second age is within the range of the threshold value,
wherein the first person is different from the second person.

15. An image processing method comprising:
reading an image from a recording device in which a plurality of images accessible by one user are recorded, by a reading device;
specifying any one of the plurality of images as a first image, by a first image specifying device;
recognizing a first person included in the first image, by a first person recognizing device;
estimating a first age of the first person at date and time of imaging for the first image, by a first age estimating device;
specifying any one of the plurality of images other than the first image as a second image, by a second image specifying device;
recognizing a second person included in the second image, by a second person recognizing device;
estimating a second age of the second person at date and time of imaging for the second image, by a second age estimating device;
determining whether or not a difference between the estimated first age and the estimated second age is within a range of a threshold value, by an age difference determining device; and
detecting the first image and the second image as an image combination in a case where it is determined by the age difference determining device that the difference between the first age and the second age is within the range of the threshold value, by an image combination detecting device,
wherein the first person is different from the second person.

16. A non-transitory tangible media storing a computer-readable program for controlling a computer of an image processing apparatus, the program controlling a computer to execute:
reading an image from a recording device in which a plurality of images accessible by one user are recorded;
specifying any one of the plurality of images as a first image;
recognizing a first person included in the first image;
estimating a first age of the first person at date and time of imaging for the first image;
specifying any one of the plurality of images other than the first image as a second image;
recognizing a second person included in the second image;

estimating a second age of the second person at date and time of imaging for the second image;

determining whether or not a difference between the estimated first age and the estimated second age is within a range of a threshold range; and detecting the first image and the second image as an image combination in a case where it is determined that the difference between the first age and the second age is within the range of the threshold value, wherein the first person is different from the second person.

17. The image processing apparatus according to claim 1, wherein the reading means reads an image from a recording device in which a plurality of images uploaded by the one user are recorded; and the image combination detecting means detects the first image uploaded by the one user and the second image uploaded by the one user as an image combination in a case where it is determined by the age difference determining means that the difference between the first age and the second age is within the range of the threshold value.

* * * * *